United States Patent
Kakita et al.

(10) Patent No.: US 10,660,503 B2
(45) Date of Patent: May 26, 2020

(54) STICKY CLEANER

(71) Applicant: KABUSHIKI KAISHA NITOMS, Tokyo (JP)

(72) Inventors: Tomio Kakita, Tokyo (JP); Takenobu Kojima, Tokyo (JP); Yousuke Suyama, Tokyo (JP); Kazumasa Shibata, Tokyo (JP)

(73) Assignee: KABUSHIKI KAISHA NITOMS, Shinagawa-ku, Tokyo (JP)

( * ) Notice: Subject to any disclaimer, the term of this patent is extended or adjusted under 35 U.S.C. 154(b) by 511 days.

(21) Appl. No.: 15/551,665

(22) PCT Filed: Feb. 24, 2016

(86) PCT No.: PCT/JP2016/055411
§ 371 (c)(1),
(2) Date: Aug. 17, 2017

(87) PCT Pub. No.: WO2016/136800
PCT Pub. Date: Sep. 1, 2016

(65) Prior Publication Data
US 2018/0035867 A1 Feb. 8, 2018

(30) Foreign Application Priority Data
Feb. 27, 2015 (JP) ................. 2015-038954

(51) Int. Cl.
*A47L 25/00* (2006.01)
*A47L 13/17* (2006.01)
(Continued)

(52) U.S. Cl.
CPC ............. *A47L 25/005* (2013.01); *A47L 13/17* (2013.01); *A47L 25/00* (2013.01); *B08B 7/0028* (2013.01);
(Continued)

(58) Field of Classification Search
CPC ........ A47L 13/17; A47L 25/00; A47L 25/005; B08B 7/0028; C09J 201/00;
(Continued)

(56) References Cited

U.S. PATENT DOCUMENTS 10,213,090 B2 * 2/2019 Sakashita ............. C11D 3/3761
10,478,043 B2 * 11/2019 Suyama ................. C09J 153/00
(Continued)

FOREIGN PATENT DOCUMENTS

CN       101418194 A    4/2009
CN       101724367 A    6/2010
(Continued)

OTHER PUBLICATIONS

Extended European Search Report dated Oct. 30, 2018, from the European Patent Office in counterpart European Application No. 16755544.0.
(Continued)

*Primary Examiner* — Marc Carlson
(74) *Attorney, Agent, or Firm* — Sughrue Mion, PLLC

(57) ABSTRACT

Provided is a sticky cleaner comprising a catcher to catch matter to be removed. The catcher has an adhesive surface formed of PSA, and the sticky cleaner satisfies the following properties: (A1) an oily dirt adhesion test to determine an adhered amount of an oily dirt sample shows an adhered amount $A_1$ of the oily dirt sample per $m^2$ of the adhesive surface of 200 $g/m^2$ or greater; and (B1) a moist/wet dirt adhesion test to determine an adhered amount of a moist/wet dirt sample shows an adhered amount $B_1$ of the moist/wet dirt sample per $m^2$ of the adhesive surface of 190 $g/m^2$ or greater. At least either the adhered amount $A_1$ of the oily dirt sample or the adhered amount $B_1$ of the moist/wet dirt sample is 350 $g/m^2$ or greater.

19 Claims, 3 Drawing Sheets

(51) Int. Cl.
*B08B 7/00* (2006.01)
*C09J 201/00* (2006.01)
*C09J 7/20* (2018.01)
*C09J 7/38* (2018.01)

(52) U.S. Cl.
CPC . *C09J 7/20* (2018.01); *C09J 7/38* (2018.01); *C09J 201/00* (2013.01); *C09J 2201/16* (2013.01); *C09J 2201/606* (2013.01); *C09J 2205/10* (2013.01)

(58) Field of Classification Search
CPC .............. C09J 2201/16; C09J 2201/606; C09J 2205/10; C09J 7/20; C09J 7/38
See application file for complete search history.

(56) References Cited

U.S. PATENT DOCUMENTS

| | | | | |
|---|---|---|---|---|
| 2002/0042962 | A1* | 4/2002 | Willman | A47L 13/16 15/208 |
| 2003/0167583 | A1* | 9/2003 | Shizuno | A47L 11/33 15/27 |
| 2004/0058116 | A1* | 3/2004 | Sano | A47L 25/005 428/40.1 |
| 2006/0173124 | A1* | 8/2006 | Paul | C08F 293/005 524/558 |
| 2009/0111343 | A1 | 4/2009 | Takahashi et al. | |
| 2009/0263153 | A1* | 10/2009 | Uenda | B08B 1/00 399/101 |
| 2010/0099318 | A1 | 4/2010 | Suzuki et al. | |
| 2012/0042902 | A1* | 2/2012 | Uenda | B08B 1/00 134/8 |
| 2012/0110760 | A1* | 5/2012 | Huang | B08B 1/00 15/103.5 |
| 2012/0114930 | A1 | 5/2012 | Yamamoto et al. | |
| 2013/0125322 | A1* | 5/2013 | Sakashita | B08B 7/0028 15/104.002 |

FOREIGN PATENT DOCUMENTS

| | | | |
|---|---|---|---|
| CN | 101969832 A | 2/2011 | |
| CN | 102559076 A | 7/2012 | |
| CN | 103108581 A | 5/2013 | |
| EP | 1 340 450 A1 | 9/2003 | |
| EP | 1340450 A1 * | 9/2003 | ........... A47L 25/005 |
| JP | 4-135267 U | 12/1992 | |
| JP | 7-116623 A | 5/1995 | |
| JP | 10-323320 A | 12/1998 | |
| JP | 2004-237023 A | 8/2004 | |
| JP | 2006-137106 A | 6/2006 | |
| JP | 2009-219574 A | 10/2009 | |
| WO | 2013/015075 A1 | 1/2013 | |

OTHER PUBLICATIONS

Notice of Termination of Reconsideration by Examiners before Appeal Proceedings dated Nov. 14, 2019, issued by the Japanese Patent Office in Application No. 2015-038954.

Notification of Reasons for Refusal dated Feb. 14, 2019 from Japanese Patent Office in counterpart JP Application No. 2015-038954.

First Office Action dated May 21, 2019 from the State Intellectual Property Office of the P.R.C. in counterpart Application No. 201680012040.5.

* cited by examiner

STICKY CLEANER

CROSS REFERENCE TO RELATED APPLICATIONS

This application is a National Stage of International Application No. PCT/JP2016/055411 filed Feb. 24, 2016, claiming priority based on Japanese Patent Application No. 2015-038954 filed Feb. 27, 2015, the contents of all of which are incorporated herein by reference in their entirety.

TECHNICAL FIELD

The present invention relates to a sticky cleaner.
The present application claims priority based on Japanese Patent Application No. 2015-038954 filed on Feb. 27, 2015 and the entire contents thereof are incorporated herein by reference.

BACKGROUND ART

As means to clean floors, carpets, etc., sticky cleaners that uses pressure-sensitive adhesive (PSA) to catch matter (dust, dirt, etc.) to be removed have been widely used. Such a sticky cleaner has, for instance, a freely rotatable roll form and PSA is placed on the roll surface. By rotating the roll while allowing the PSA on the roll surface to make contact with an area being cleaned, matter to be removed on the area being cleaned is caught with the PSA and eliminated. Publications disclosing this type of conventional art include Patent Document 1.

CITATION LIST

Patent Literature

[Patent Document 1] Japanese Patent Application Publication No. 2004-237023

SUMMARY OF INVENTION

Technical Problem

Conventional sticky cleaners can show great abilities to catch typical solid dirt. However, for instance, with respect to solid dirt having an oily component on the surface such as dirt originating from snacks such as potato chips, the catching abilities have had a tendency to degrade as compared to typical solid dirt. With respect to these sticky cleaners, the abilities to catch solid dirt with some water such as vegetable scraps present in kitchen sinks have had a tendency to degrade as well. In short, conventional cleaners have not been necessarily convenient for removal of some types of matter. It is beneficial to provide a sticky cleaner capable of sufficiently removing not only typical solid dirt, but also solid dirt having an oily component on the surface as well as solid dirt having a moist/wet surface, with the sticky cleaner having greater removal power while covering a wider range of applications.

The present invention relates to improvements made to the conventional art with an objective to provide a sticky cleaner capable of sufficiently removing solid dirt having an oily component on the surface as well as solid dirt having a wet surface.

Solution Problem

To achieve the objective, this invention provides a sticky cleaner comprising a catcher to catch matter to be removed. The catcher has an adhesive surface formed of a PSA. The sticky cleaner satisfies the following properties: (A1) in an oily dirt adhesion test to determine an adhered amount of oily dirt sample, the adhered amount $A_1$ of oily dirt sample per $m^2$ of adhesive surface is 200 $g/m^2$ or greater, wherein the oily dirt sample is prepared by adding 5 parts by weight of edible oil to 100 parts by weight of aggregate having a central particle diameter of 1.20 mm to 1.50 mm; and (B1) in a moist/wet dirt adhesion test to determine an adhered amount of moist/wet dirt sample, the adhered amount $B_1$ of moist/wet dirt sample per $m^2$ of adhesive surface is 190 $g/m^2$ or greater, wherein the moist/wet dirt sample is prepared by adding 20 parts by weight of an aqueous solution with 5% (by weight) surfactant to 100 parts by weight of aggregate having a central particle diameter of 1.20 mm to 1.50 mm. At least the adhered amount $A_1$ of oily dirt sample or the adhered amount $B_1$ of moist/wet dirt sample is 350 $g/m^2$ or greater.

The sticky cleaner satisfying the composition and the properties can sufficiently catch solid dirt having an oily component on the surface (or "oily dirt" or "oily crumbs" hereinafter) and solid dirt having water on the surface (or "moist/wet dirt" or "moist/wet crumbs" hereinafter). Thus, the sticky cleaner is preferably used for removal of matter including oily crumbs and moist/wet crumbs (possibly including solid dirt such as dust and crumbs, liquid dirt, etc.). According to this invention, one sticky cleaner can remove oily crumbs as well as moist/wet crumbs at different times, whereby the range of species of matter removed by the sticky cleaner broadens. The inconvenience of using several proper cleaners can be avoided as well. Thus, this invention provides a convenient sticky cleaner capable of sufficiently removing oily crumbs, moist/wet crumbs and other waste matter.

As used herein, the oily dirt or crumbs refer to solid dirt having an oily component (oil and fat) on the surface as described above and can also be described as solid dirt having an oily component at least partially on the surface. Specific examples include solid dirt having a certain amount of an oily component, some of which is present on the surface, such as dirt originating from snacks such as potato chips. The oily dirt or crumbs encompass solid dirt mostly formed of an oily component (which can be in a liquid or solid state) as well.

As used herein, the moist/wet dirt or crumbs refer to solid dirt having water on the surface as described above and can also be described as solid dirt with an at least partially moist/wet surface. For instance, it can be solid dirt comprising water, some of which is present on the surface. The moist/wet dirt or crumbs encompass solid dirt mostly formed of an aqueous component (typically water).

In a preferable embodiment of the art disclosed herein, the sticky cleaner further satisfies the next property: (A2) in an oily dirt loss test where the sticky cleaner bearing the oily dirt sample is dropped from a height of 5 cm to a hard surface, the percent loss A2 of oily dirt sample is 50% or lower. The sticky cleaner satisfying this property can tightly hold oily dirt that has been collected and reduce or prevent the occurrence of failure, such as fall-off of the collected oily dirt on the way. The sticky cleaner satisfying this property can be particularly preferably used to remove dust and dirt including oily crumbs.

In a preferable embodiment of the art disclosed herein, the sticky cleaner further satisfies the next property: (B2) in a moist/wet dirt loss test where the sticky cleaner bearing the moist/wet dirt sample is dropped from a height of 5 cm to a hard surface, the percent loss $B_2$ of moist/wet dirt sample is 50% or lower. The sticky cleaner satisfying this property can tightly hold moist/wet dirt that has been collected and reduce or prevent the occurrence of failure such as fall-off of the collected moist/wet dirt on the way. The sticky cleaner satisfying this property can be particularly preferably used to remove dust and dirt including moist/wet crumbs.

In a preferable embodiment of the art disclosed herein, the catcher comprises a first catching part forming part of the adhesive surface and a second catching part forming other part of the adhesive surface. According to this embodiment, for instance, by forming the first catching part with an excellent ability to catch oily crumbs and the second catching part with an excellent ability to catch moist/wet crumbs, an embodiment that satisfies the respective properties according to the present invention can be preferably obtained.

This invention provides a sticky cleaner comprising a catcher to catch matter to be removed. The catcher has an adhesive surface formed of a PSA. The catcher comprises an oily-dirt-catching part as the first catching part forming part of the adhesive surface and a moist/wet-dirt-catching part as the second catching part forming other part of the adhesive surface.

The sticky cleaner in this embodiment can collect oily dirt with the oily-dirt-catching part and moist/wet dirt with the moist/wet-dirt-catching part. Thus, the sticky cleaner is preferably used to remove waste matter including both oily dirt and moist/wet dirt (possibly including solid dirt such as dust and crumbs, liquid dirt, etc.). According to this invention, one sticky cleaner can remove oily dirt as well as moist/wet dirt at different times, whereby the range of species of matter removed by the sticky cleaner broadens. The inconvenience of using several proper cleaners can be avoided as well. Thus, this invention provides a convenient sticky cleaner capable of removing oily crumbs, moist/wet crumbs and other waste matter well.

Each of the first and second catching parts is preferably exposed on the adhesive surface in stripes. Such an embodiment reduces unevenness in catching oily crumbs and moist/wet crumbs.

In a preferable embodiment of the art disclosed herein, the catcher is formed as an adhesively single-faced PSA sheet comprising a support substrate sheet and a PSA layer placed on one face of the support substrate to form the adhesive surface. In such an embodiment, the adhesive strength of the PSA layer surface (adhesive surface) supported on the support substrate is used to catch oily crumbs and moist/wet crumbs.

The support substrate is preferably a foam sheet. With the use of the foam sheet as the support substrate, the hold of crumbs on the PSA sheet as the catcher is further enhanced, and the abilities to catch crumbs and prevent their loss (fall-off) are increased.

The adhesive surface preferably exhibits a 180° peel strength of 9 N/25 mm or less. The sticky cleaner with peel strength reduced to or below the prescribed value shows great cleaning workabilities. Typically, with reduced peel strength as described above, the abilities to catch crumbs tend to degrade. Despite of the peel strength reduced to or below the prescribed value, however, the sticky cleaner disclosed herein can sufficiently catch oily crumbs and moist/wet crumbs.

The single-faced PSA sheet is preferably wound with the PSA layer on the outside to form a PSA sheet roll. In such an embodiment, by allowing the outer circumferential face of the PSA sheet roll to make contact with an area being cleaned, crumbs can be caught well. By removing (e.g. by peeling off) the outer circumferential sheet used for cleaning from the roll in accordance with the frequency of use and the amount of crumbs and the like stuck thereon, etc., an unused PSA layer can be exposed on the outer circumferential face. In other words, the PSA layer can be easily renewed to expose an unused section to the outer surface. By the renewal, desirable cleaning abilities (e.g. dirt-catching abilities) can be maintained for a long time.

In a preferable embodiment of the art disclosed herein, the sticky cleaner comprises a cylindrical rolling member and the PSA sheet roll is placed on the outer circumferential face of the rolling member. By rotating the rolling member in the circumferential direction of the cylinder, with the adhesive surface on the outer circumferential face, the sticky cleaner in such an embodiment can efficiently catch crumbs and the like in the area being cleaned and remove them from the area being cleaned.

The sticky cleaner disclosed herein may further comprise a grip member that supports the rolling member in a freely rotatable manner. With this configuration, a user can hold the grip member and rotate the rolling member to efficiently remove the sort of dust from an area to be cleaned.

DESCRIPTION OF EMBODIMENTS

Figure 1:
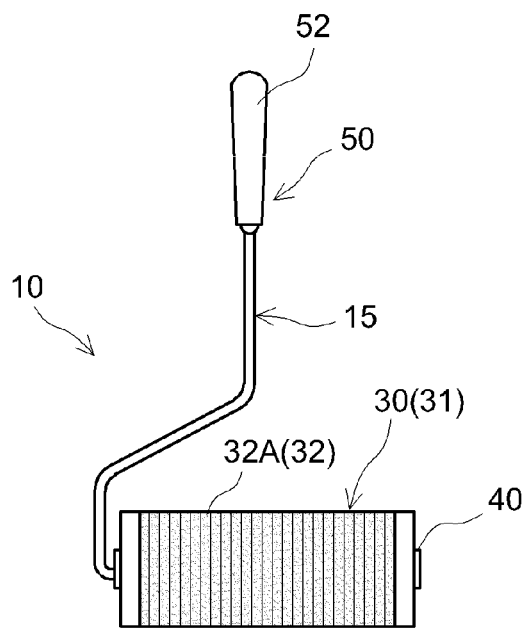
FIG. 1 shows a front view schematically illustrating the sticky cleaner according to an embodiment.

Preferred embodiments of the present invention are described below. Matters necessary to practice this invention other than those specifically referred to in this description may be understood as design matters to a person of ordinary skill in the art based on the conventional art in the pertinent field. The present invention can be practiced based on the contents disclosed in this description and technical common knowledge in the subject field. In the drawings referenced below, a common reference numeral may be assigned to members or sites producing the same effects, and duplicated descriptions may be omitted or simplified.

<Example of Structure of Sticky Cleaner>

Figure 2:
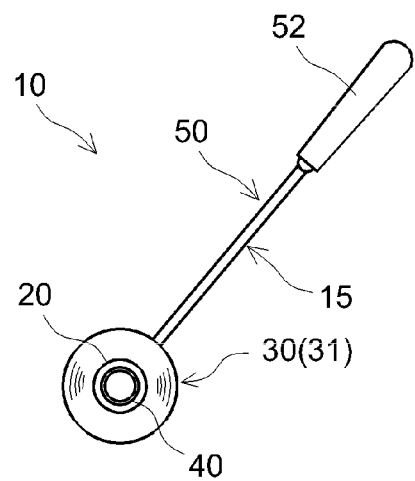
FIG. 2 shows a side view schematically illustrating the sticky cleaner according to an embodiment.

The sticky cleaner according to an embodiment is described below with reference to drawings. As shown in FIGS. 1 and 2, a sticky cleaner (or simply cleaner, hereinafter) 10 comprises a PSA sheet roll 30. Cleaner 10 also comprises a holding member (roll core) 20 to hold PSA sheet roll 30. PSA sheet roll 30 is held on the outer circumferential face of cylindrical holding member 20 to form a unit with holding member 20. Cleaner 10 further comprises a main cleaner body 15. Main cleaner body 15 comprises a cylindrical rolling member 40 and a pole-shaped grip member 50 that supports rolling member 40 in a freely rotatable manner. To rolling member 40, holding member 20 is fastened in a detachable manner and is in an embodiment where holding member 20 and PSA sheet roll 30 move together along with rotation of rolling member 40 and rotate in the circumferential direction of the roll.

While no particular limitations are imposed to its dimensions, the cylindrical PSA sheet roll has a diameter (the diameter (outer diameter) when unused; the same applies hereinafter) of about 10 mm to 200 mm (e.g. 30 mm to 100 mm, typically 40 mm to 60 mm) and a width of about 50 mm to 700 mm (e.g. 60 mm to 350 mm, typically 80 mm to 160 mm).

Rolling member 40 forming main cleaner body 15 has a center hole (not shown in the drawings) formed, in particular, where the central axis of the cylinder is located. A terminal section (one end) of grip member 50 is inserted through the center hole, whereby rolling member 40 is attached to grip member 50 in a freely rotatable manner. To the other end of grip member 50, a handle 52 is attached as a member constituting the main cleaner body 15. The material of the holding member is not particularly limited. A holding member made of a polyolefin, polyester or other synthetic resin as well as paper can be preferably used. The materials of the rolling member, grip member and handle are not particularly limited. For instance, they can be made of polyolefinic, polyester-based and other synthetic resins or can be made of a metal such as stainless steel.

Figure 3:
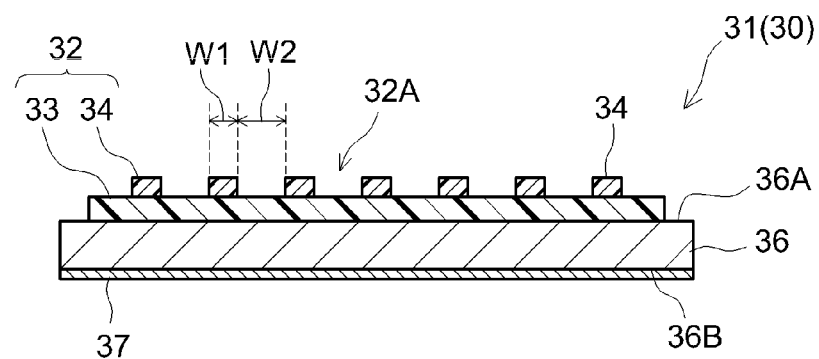
FIG. 3 shows a width-wise schematic cross-sectional view of the PSA sheet (catcher) of the sticky cleaner according to an embodiment.

PSA sheet roll 30 is formed by winding a PSA sheet 31 that serves as a catcher to collect solid dirt. PSA sheet (catcher) 31 is in a long sheet (strip) and is constituted as a single-faced PSA sheet 31 comprising, as shown in FIG. 3, a support substrate 36 and a PSA layer 32 placed on one face 36A of support substrate 36. On the other face 36B of support substrate 36, a release layer 37 is formed, which is obtainable by laminating polyethylene. Single-faced PSA sheet 31 is wound with the PSA layer 32 on the outside and formed as a PSA sheet roll 30.

The PSA layer 32 has a bilayer structure formed of a first PSA layer 33 placed on support substrate 36 and a second PSA layer 34 placed partially on the first PSA layer 33. In particular, the first PSA layer 33 is placed almost entirely over one face 36A of support substrate 36, excluding the vicinities of the two edges (dry edges) of the width direction (i.e. the two lengthwise edges) of support substrate 36. Over the surface of the first PSA layer 33, the second PSA layer 34 is placed in stripes formed of several lines (bands) running in the length direction of PSA sheet 31. In other words, the second PSA layer 34 forms part of the adhesive surface 32A of PSA layer 32 and is exposed as stripes on the adhesive surface 32A. The several lines are arranged in parallel, separated by certain spaces. With the second PSA layer 34 thus formed, the first PSA layer 33 also forms part of adhesive surface 32A of the PSA layer 32 (the other part excluding the second PSA layer 34) and is exposed as stripes on the adhesive surface 32A.

In the present embodiment, the first PSA layer 33 is the first catching part as the oily-dirt-catching part and the second PSA layer 34 is the second catching part as the moist/wet-dirt-catching part. The first PSA layer 33 is formed from a PSA for catching oily crumbs (an oily-dirt-catching PSA). The second layer 34 is formed from a PSA for catching moist/wet crumbs (a moist/wet-dirt-catching PSA). Their details are described later.

In the adhesive surface 32A of PSA layer 32, with respect to the each line's width W1 (the width of one stripe) of the second catching part (second PSA layer) 34 arranged in stripes and the width W2 of an exposed section (a space between stripes) of the first catching part (first PSA layer) 33, their ratio (W1/W2) can be designed in accordance with the matter to be removed, the application, etc. From the standpoint of adequately catching oily crumbs and moist/wet crumbs, the W1/W2 ratio is suitably about 0.1 to 10, or preferably in a range of 0.3 to 3 (e.g. 0.5 to 2). When the adhesive strength is different between the first catching part (first PSA layer) 33 and the second catching part (second PSA layer) 34, the W1/W2 ratio can be suitably selected to adjust the peel strength of the adhesive surface 32A. For instance, this can make release treatment to the backside of the support substrate unnecessary.

The width W1 of each line of the second catching part (second PSA layer) 34 can be designed in accordance with the matter to be removed and the application as well as the dimensions of the sticky cleaner, etc. It is preferably about 0.1 mm to 10 mm (e.g. 0.2 mm to 5 mm, typically 0.5 m to 3 mm). The width W2 of an exposed section of the first catching part (first PSA layer) 33 can also be designed in accordance with the matter to be removed and the application as well as the dimensions of the sticky cleaner, etc. It is preferably about 0.1 mm to 10 mm (e.g. 0.2 mm to 5 mm, typically 0.5 mm to 3 mm).

The first catching part (first PSA layer) 33 is preferably formed to account for 5% to 95% (e.g. 15% to 85%, typically 30% to 70%) of unit area of the adhesive surface 32A. The second catching part (second PSA layer) 34 is preferably formed to account for 5% to 95% (e.g. 15% to 85%, typically 30% to 70%) of unit area of the adhesive surface 32A. By this, oily crumbs and moist/wet crumbs can be collected well.

Cleaner 10 in such an embodiment is used to remove dirt (dust, crumbs, liquid dirt, etc.) including oily crumbs and moist/wet crumbs present in areas to be cleaned such as floors and carpet. It is typically used in the following manner: A worker places PSA sheet roll 30 of cleaner 10 in the area to be cleaned, grips handle 52, and applies certain external force to cleaner 10; the external force is transmitted via grip member 50 to rolling member 40 to rotate rolling member 40. This causes the PSA layer 32 of PSA sheet roll 30 placed on the outer circumferential face of rolling member 40 to move on the area being cleaned in association with the rotation of rolling member 40. In such a way, oily crumbs and moist/wet crumbs in the area being cleaned are caught on the surface (adhesive surface) 32A of the PSA layer 32, whereby the oily crumbs and moist/wet crumbs are removed from the area cleaned.

In the PSA sheet roll, the PSA sheet preferably has a cut line (not shown in the drawings) approximately every circumference. The cut lines provide cutting means for efficiently renew the PSA layer surface (outer surface of the catcher) with a reduced cleaning (dirt-removing) ability after the cleaner is used several times. The cut lines can be, for instance, lines of long holes or wavy slits; intermittent slits such as perforation; and the like. The cut lines are preferably arranged to run across the PSA sheet in the width direction (direction perpendicular to the length direction). Renewing the lateral surface of the catcher is not limited to the cutting means. For instance, intermittent slits such as perforation can be spirally formed in a direction intersecting the winding direction of the PSA sheet roll (typically, in a direction intersecting the width direction at an angle between 30° and 60°). Alternatively, instead of intermittent slits such as perforation, the PSA sheet constituting the PSA sheet roll may comprise slits (continuous cut lines) at a prescribed interval. In this embodiment, the PSA sheet constituting the PSA sheet roll is fully cut in advance at the prescribed intervals in the winding direction of the roll. Thus, the outer surface of the PSA sheet roll can be peeled over the length of the prescribed interval to easily renew the outer surface. After the PSA sheet roll is used up upon repetitive renewals, for instance, holding member 20 shown in FIGS. 1 and 2 is detached from rolling member 40 and a new PSA sheet roll is installed as a replacement and used again for cleaning.

A sticky cleaner as described above can be produced by suitably employing heretofore known techniques. For instance, a long PSA sheet is wound around a holding member with the PSA layer on the outer circumferential face to form a roll of the PSA sheet. The holding member is attached to a rolling member to construct a cleaner. The method for producing the PSA sheet is described later. The structure of attachment of the holding member to the rolling member and the structure of the main cleaner body can be the same as a conventional cleaning roller and do not characterize the present invention. Thus, details are omitted.

The sticky cleaner is not limited to the embodiment above. For instance, the sticky cleaner may consist of a catcher. In the above embodiment, the catcher is formed of the support substrate and the PSA layer, but the sticky cleaner is not limited to this embodiment. For instance, the catcher may be formed solely with a PSA (e.g. substrate-free PSA). Alternatively, when the catcher has a support substrate, the shape of the support substrate is not particularly limited. For instance, the catcher may have a PSA layer on the outer surface of a cylindrical support substrate.

In the above embodiment, the PSA sheet roll is attached via the rolling member to the grip member in a freely rotatable manner, but the sticky cleaner is not limited to this embodiment. For instance, the grip member may be directly or indirectly joined (connected or detachably joined) to the catcher. In an example of such a sticky cleaner, a columnar or cuboid PSA body is fastened to one end of a pole-shaped grip member.

In this embodiment, the PSA layer has a structure in which the second PSA layer is partially layered over the first PSA layer, but the art disclosed herein is not limited to this embodiment. The PSA layer may have a monolayer structure. For instance, two types of PSA can be separately applied onto a support substrate to obtain a structure having the first catching part and the second catching part in a single PSA layer.

In this embodiment, each of the first and second catching parts is exposed as linear stripes on the adhesive surface of the PSA layer. The art disclosed herein is not, however, limited to this. The first and second catching parts may have curvilinear, rectilinear, or wavy stripe patterns, etc. Alternatively, they can have lattice patterns, dot patterns, and other various patterns. Such a pattern can be formed by suitably employing techniques such as printing.

In the embodiment above, the first PSA layer is an oily-dirt-catching part formed of oily-dirt-catching PSA and the second PSA layer is a moist/wet-dirt-catching part formed of moist/wet-dirt-catching PSA, but the art disclosed herein is not limited to this. The PSA layer can be obtained by partially placing the second PSA layer (oily-dirt-catching part) formed of oily-dirt-catching PSA on top of the first PSA layer (moist/wet-dirt-catching part) formed of moist/wet-dirt-catching PSA.

<Properties of Sticky Cleaner>

The sticky cleaner disclosed herein preferably satisfies the next property: (A1) in an oily dirt adhesion test to determine an adhered amount of oily dirt sample, the adhered amount $A_1$ of oily dirt sample per m$^2$ of adhesive surface is 200 g/m$^2$ or greater, wherein the oily dirt sample is prepared by adding 5 parts by weight of edible oil to 100 parts by weight of aggregate having a core particle diameter of 1.20 mm to 1.50 mm. The sticky cleaner satisfying this property shows an excellent ability to catch oily crumbs. The adhered amount $A_1$ is more preferably 350 g/m$^2$ or greater, yet more preferably 400 g/m$^2$ or greater, particularly preferably 500 g/m$^2$ or greater (e.g. 700 g/m$^2$ or greater, typically 800 g/m$^2$ or greater). The oily dirt adhesion test can be carried out as described below.

[Oily Dirt Adhesion Test]

An oily dirt sample is obtained for testing. The oily dirt sample is formed of 100 parts by weight of aggregate and 5 parts by weight of edible oil. In typical, the aggregate supplemented with the edible oil is used. As the aggregate, a component having a central particle diameter in a range of 1.20 mm to 1.50 mm by sieve analysis is used. As the aggregate, quartz sand is preferably used. The aggregate supplemented with the edible oil can be used as the oily dirt sample, for instance, after vigorous shaking in a plastic bag for even distribution of the edible oil. The resulting oily dirt sample is spread over the entire bottom face of a flat bottom tray (e.g. a 240 mm by 320 mm stainless steel stray). Onto this, the adhesive surface of a sticky cleaner is pressed in a manner that allows the entire adhesive surface to make contact with the oily dirt sample and causes the oily dirt sample to adhere to the adhesive surface of the sticky cleaner. The oily dirt sample can be used in an amount of about 200 g. After the oily dirt sample is adhered, the weight W1 (g) of the sticky cleaner is determined. Based on the difference from the pre-determined initial weight W0 (g) of the sticky cleaner before adhesion of the oily dirt sample, the adhered amount W2 of oily dirt sample is determined (W2 (g)=W1−W0). W2 (g) is divided by the area (m$^2$) of adhesive surface of the sticky cleaner to determine the adhered amount $A_1$ (g/m$^2$) of oily dirt sample per m$^2$ of adhesive surface.

As the quartz sand used in the test, the Sinto Color Sand 34 series (color aggregate (quartz sand (natural quartz, corundum, basalt, sandstone, volcanic ash pumice, etc.) having a surface sintered with inorganic pigment for porcelain) with central particle diameter of 1.20 mm to 1.50 mm and standard sieve size of 0.5 mm to 2.4 mm, available from Shintoh Tohryoh Co., Ltd.) can be used. As the edible oil, Nisshin Canola Oil Healthy Light available from Nisshin Oillio Group can be used.

When the catcher of the sticky cleaner is a single-faced PSA sheet comprising a support substrate sheet and a PSA layer placed on one face of the support substrate to form the adhesive surface, it is desirable to carry out the oily dirt adhesion test in the manner described below.

Figure 4:
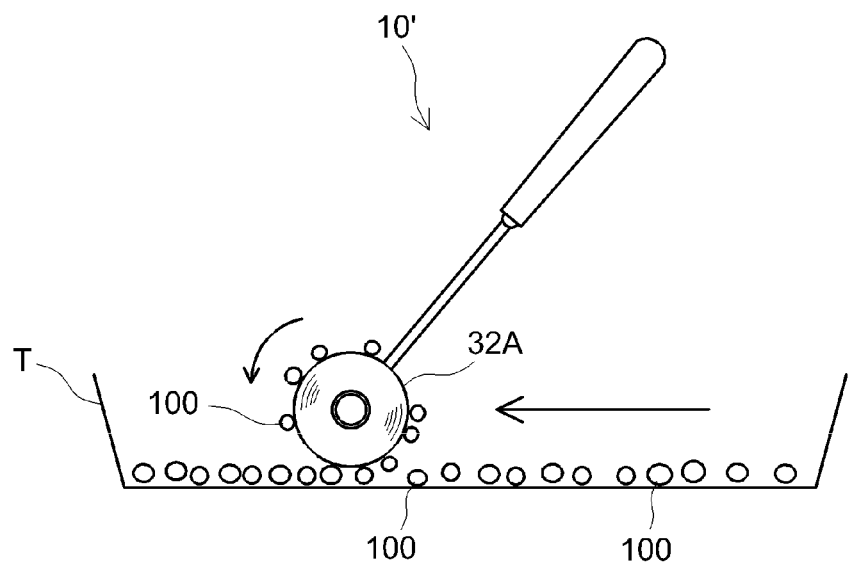
FIG. 4 shows a diagram schematically illustrating a solid dirt adhesion test method.

The catcher (single-faced PSA sheet) of a sticky cleaner to be analyzed is cut to a 157 mm by 150 mm size to fabricate a test sample. With its adhesive surface on the outside, the test sample is applied to the entire outer surface (circumferential face) of PSA sheet roll 30 (50 mm diameter (outer diameter), 160 mm width) of sticky cleaner 10 shown in FIGS. 1 and 2 to prepare a test cleaner. Subsequently, 200 g of the oily dirt sample is spread over the entire bottom face of a flat bottom tray (a 240 mm by 320 mm stainless steel stray). On this, as shown in FIG. 4, the adhesive surface 32A of test cleaner 10' prepared is brought into contact and rotated to make two round trips between the two edges of the length direction (the two widthwise edges) of tray T to cause oily dirt sample 100 to adhere to the adhesive surface 32A. After the oily dirt sample is adhered, the weight W1 (g) of the sticky cleaner 10' is determined. Based on the difference from the pre-determined initial weight W0 (g) of the sticky cleaner 10' before the oily dirt sample is adhered, the adhered amount W2 of oily dirt sample is determined (W2

(g)=W1−W0). W2 (g) is divided by the area (m²) of exposed adhesive surface 32A of the test sample to determine the adhered amount $A_1$ (g/m²) of oily dirt sample per m² of adhesive surface.

The test cleaner used in the measurement is not particularly limited. For instance, it may have a total weight of about 100 g to 500 g with an approximately 10 g to 250 g PSA sheet roll and an approximately 10 g to 50 g rolling member. When the sticky cleaner having the single-faced PSA sheet to be analyzed has a structure outlined in FIGS. 1 and 2 with total, sheet roll and rolling member weights in the aforementioned ranges, the oily dirt adhesion test can be carried out, using the sticky cleaner as the test cleaner. For the oily dirt sample, the one described above can be used. More specifically, the oily dirt adhesion test may be carried out by the measurement method described later in the working examples. The characteristic related to the adhered amount $A_1$ of oily dirt sample is thought as a favorable characteristic that specifies the present invention, but is not necessarily essential to the present invention. Thus, the present invention also includes an embodiment that does not include a limited characteristic related to the adhered amount $A_1$ of oily dirt sample.

The sticky cleaner disclosed herein preferably satisfies the next property: (A2) in an oily dirt loss test where the sticky cleaner bearing the oily dirt sample is dropped from a height of 5 cm to a hard surface, the percent loss $A_2$ of oily dirt sample is 50% or lower. The sticky cleaner satisfying this property retains oily crumbs well because, even when certain impact is applied, the amount of oily dirt sample that falls off (lost) is reduced. The percent loss $A_2$ is more preferably 30% or lower, yet more preferably 10% or lower, or particularly preferably 7% or lower. The sticky cleaner bearing the oily dirt sample is typically a sticky cleaner onto which an oily dirt sample has been adhered by the oily dirt adhesion test method described above. The oily dirt loss test can be carried out as described below.

[Oily Dirt Loss Test]

After the oily dirt adhesion test is carried out, the oily dirt loss test may be continuously conducted. On a hard surface (typically, a hard, flat surface made of a metal, plastic, or wood), the sticky cleaner bearing the oily dirt sample is placed with the lowest part of the catcher 5 cm in height above the hard surface. From this height, the sticky cleaner is dropped. The weight W4 (g) of the dropped sticky cleaner is determined. Based on the difference from the pre-determined initial weight W3 (g) (which can be W1 as well) of the sticky cleaner before dropped, the amount W5 of oily dirt sample lost (that has fallen off) is determined (W5 (g)=W3−W4). From the equation $A_2(\%)=W5/(W3-W0)\times 100$, the percent (%) loss $A_2$ of oily dirt sample is determined. In the equation, W0 is the initial weight (g) of the sticky cleaner before the oily dirt sample is adhered.

When the catcher of the sticky cleaner is a single-faced PSA sheet comprising a support substrate sheet and a PSA layer placed on one face of the support substrate to form the adhesive surface, it is desirable to carry out an oily dirt loss test continuously after the oily dirt adhesion test using the single-faced PSA sheet.

Figure 5A:
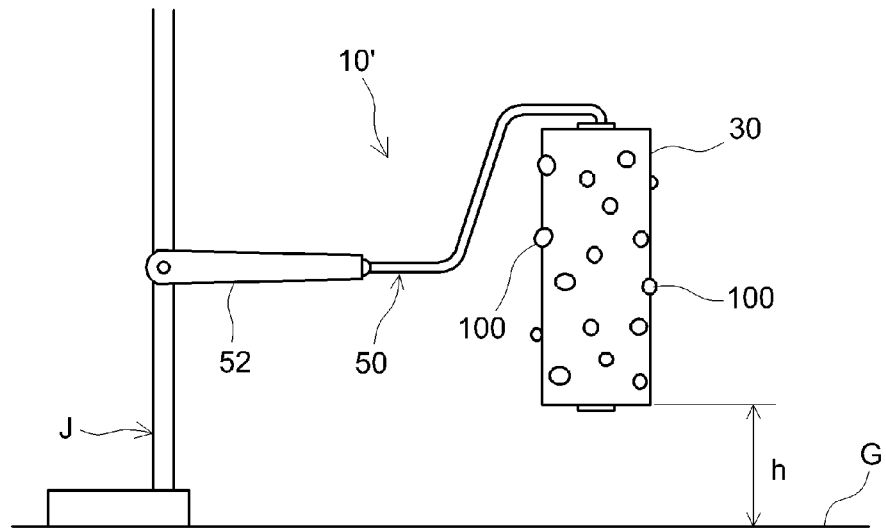
FIGS. 5(a) and 5(b) show a diagram schematically illustrating a solid dirt loss test method, with 5(a) illustrating the state of the sticky cleaner before dropped and 5(b) illustrating the state after dropped.
Figure 5B:
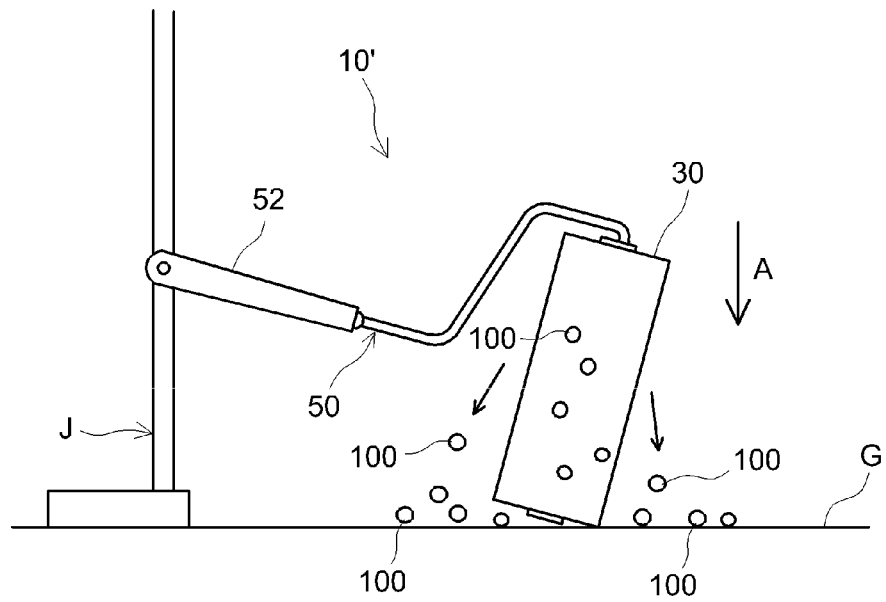

As shown in FIG. 5(a), above a hard flat surface G, with the PSA sheet roll 30 of test cleaner 10' bearing oily dirt sample 100 oriented with its cylindrical axis in the vertical direction and the bottom end (base) of the PSA sheet roll 30 placed 5 cm in height (indicated by h in FIG. 5(a)) above the hard flat surface G, the end of grip member 50 on the handle 52 side is fixed onto a jig J in a vertically freely rotatable manner. Test cleaner 10' may be held at the height with a spacer (not shown in the drawing) placed between the bottom end of PSA sheet roll 30 and the hard flat surface G, etc. By pulling out the spacer, etc., as shown in FIG. 5(b), the PSA sheet roll 30 side of test cleaner 10' is dropped. The weight W4 (g) of the dropped test cleaner 10' is determined. Based on the difference from the pre-determined initial weight W3 (g) (which can be W1 as well) of test cleaner 10' before dropped, the amount W5 of oily dirt sample lost (that has fallen off) is determined (W5 (g)=W3−W4). From the equation $A_2(\%)=W5/(W3-W0)\times 100$, the percent (%) loss $A_2$ of oily dirt sample is determined. The test cleaner used in the measurement is not particularly limited. For instance, it may have a total weight of about 100 g to 500 g with an approximately 10 g to 250 g PSA sheet roll and an approximately 10 g to 50 g rolling member. When the sticky cleaner having the single-faced PSA sheet to be analyzed has a structure outlined in FIGS. 1 and 2 with total, sheet roll and rolling member weights in the aforementioned ranges, the oily dirt loss test can be carried out, using the sticky cleaner as the test cleaner. For the oily dirt sample, the one described above can be used. More specifically, the oily dirt loss test may be carried out by the measurement method described later in the working examples.

The sticky cleaner disclosed herein preferably satisfies the next property: (B1) in a moist/wet dirt adhesion test to determine an adhered amount of moist/wet dirt sample, the adhered amount $B_1$ of moist/wet dirt sample per m² of adhesive surface is 190 g/m² or greater, wherein the moist/wet dirt sample is prepared by adding 20 parts by weight of an aqueous solution with 5% (by weight) surfactant to 100 parts by weight of aggregate having a central particle diameter of 1.20 mm to 1.50 mm. The sticky cleaner satisfying this property catches moist/wet crumbs well. The adhered amount $B_1$ is more preferably 250 g/m² or greater, yet more preferably 300 g/m² or greater, or particularly preferably 350 g/m² or greater (e.g. 400 g/m² or greater, typically 500 g/m² or greater).

The moist/wet dirt adhesion test can be carried out, using a moist/wet dirt sample in place of the oily dirt sample, but otherwise in the same manner as the oily dirt adhesion test. By this, the adhered amount $B_1$ (g/m₂) of moist/wet dirt sample per m² of adhesive surface is determined. The moist/wet dirt sample is prepared from aggregate and an aqueous solution obtainable by dissolving a surfactant in water. In particular, the moist/wet dirt sample is prepared by adding 20 parts by weight of an aqueous solution with 5% (by weight) surfactant to 100 parts by weight of aggregate. As the aggregate, a component having a central particle diameter in a range of 1.20 mm to 1.50 mm by sieve analysis is used. As the aggregate, quartz sand is preferably used. The quartz sand supplemented with the aqueous surfactant solution can be used as the moist/wet dirt sample, for instance, after vigorous shaking in a plastic bag for even distribution of water. In particular, as the quartz sand used in the test, the Sinto Color Sand 34 series (color aggregate (quartz sand having a surface sintered with inorganic pigment for porcelain) with central particle diameter of 1.20 mm to 1.50 mm and standard sieve size of 0.5 mm to 2.4 mm, available from Shintoh Tohryoh Co., Ltd.) can be used. For the water, distilled water or deionized water (ion-exchanged water) can be used. As the surfactant, a 40% lauryl sulfate triethanolamine solution (available from Wako Pure Chemical Industries, Ltd.) can be used.

When the catcher of the sticky cleaner is a single-faced PSA sheet comprising a support substrate sheet and a PSA layer placed on one face of the support substrate to form the adhesive surface, it is desirable to carry out the moist/wet dirt adhesion test, using the moist/wet dirt sample in place of the oily dirt sample, but otherwise in the same manner as the oily dirt adhesion test for the catcher formed of a single-faced PSA sheet. More specifically, the moist/wet dirt adhesion test may be carried out by the measurement method described later in the working examples. The characteristic related to the adhered amount $B_1$ of moist/wet dirt sample is thought as a favorable characteristic that specifies the present invention, but is not necessarily essential to the present invention. Thus, the present invention also includes an embodiment that does not include a limited characteristic related to the adhered amount $B_1$ of moist/wet dirt sample.

The sticky cleaner disclosed herein satisfies the next property: (B2) in a moist/wet dirt loss test where the sticky cleaner bearing the moist/wet dirt sample is dropped from a height of 5 cm to a hard surface, the percent loss $B_2$ of moist/wet dirt sample is 50% or lower. The sticky cleaner satisfying this property retains oily crumbs well because, even when certain impact is applied, the amount of oily dirt sample that falls off is reduced. The percent loss $B_2$ is preferably 40% or lower, more preferably 30% or lower, or particularly preferably 20% or lower (e.g. 10% or lower, typically 5% or lower). The sticky cleaner bearing the moist/wet dirt sample is typically a sticky cleaner onto which a moist/wet dirt sample is adhered by the moist/wet dirt adhesion test method described above.

The moist/wet dirt loss test can be carried out, using a moist/wet dirt sample in place of the oily dirt sample, but otherwise in the same manner as the oily dirt adhesion test. By this, the percent (%) loss $B_2$ of moist/wet dirt sample is determined.

When the catcher of the sticky cleaner is a single-faced PSA sheet comprising a support substrate sheet and a PSA layer placed on one face of the support substrate to form the adhesive surface, it is desirable to carry out a moist/wet dirt loss test continuously after the moist/wet dirt adhesion test using the single-faced PSA sheet is carried out. It is desirable to carry out the moist/wet dirt loss test for the catcher formed of a single-faced PSA sheet, using the moist/wet dirt sample in place of the oily dirt sample, but otherwise in the same manner as the oily dirt loss test for the catcher formed of a single-faced PSA sheet.

As the moist/wet dirt sample, the one described earlier can be used. More specifically, the moist/wet dirt loss test may be carried out by the measurement method described later in the working examples.

The adhesive surface of the sticky cleaner disclosed herein preferably exhibits a 180° peel strength (to-SUS adhesive strength) of 12.5 N/25 mm or less. The sticky cleaner with peel strength reduced to or below the prescribed value shows great cleaning workabilities. The peel strength is more preferably 9 N/25 mm or less (e.g. 7 N/25 mm or less, typically 5 N/25 mm or less). When a roll of a PSA sheet is used as the catcher, the sticky cleaner with low peel strength tends to show great peel workabilities (ease of renewal) for peeling off the outermost PSA sheet. The peel strength being at or below the prescribed value is also preferable, for instance, in view of reducing the load applied to the support substrate (typically a foam sheet). From the standpoint of the ease of catching solid dirt, the lower limit of the 180° peel strength is preferably 1 N/25 mm or greater (e.g. 3 N/25 mm or greater). A high 180° peel strength is advantageous also in view of preventing oily crumbs and moist/wet crumbs from falling off. The 180° peel strength is the measurement value based on the 180° peel test on a stainless steel (SUS304) plate specified in JIS Z 0237.

In particular, the peel strength is determined by the following procedures: A catcher (typically a PSA sheet) is cut to a rectangular sheet to obtain a test piece. The test piece preferably has a length of about 100 mm to 200 mm and a width of about 15 mm to 30 mm. When the width is not 25 mm, the value in N/25 mm can be determined (by conversion) based on the ratio of actual width to standard width 25 mm. The thickness is not particularly limited. The resulting test piece is adhered over its sticky face (e.g. PSA layer side surface) to a stainless steel (SUS304) plate with a 2 kg roller moved back and forth once. When the test piece is sticky on each face such as in a double-faced PSA sheet, etc., it is preferable to back the surface opposite the measured surface with a polyethylene terephthalate (PET) film of about 25 μm in thickness. This is stored in an environment at 23° C. and 50% RH for 30 minutes. Based on JIS Z 0237, in an environment at 23° C. and 50% RH, using a tensile tester, the 180° peel strength (N/25 mm) (to-SUS peel strength) is determined at a peel angle of 180° at a tensile speed of 300 mm/min. The tensile tester is not particularly limited. A heretofore known tensile tester can be used. For instance, measurements can be made with trade name "TENSILON" available from Shimadzu Corporation. The same method is employed in the working examples described later.

The adhesive surface of the sticky cleaner disclosed herein preferably exhibits a 180° peel strength (to-PE adhesive strength) of 10 N/25 mm or less to a polyethylene (PE) plate as the adherend. The sticky cleaner with the to-PE adhesive strength reduced to or below the prescribed value provides excellent cleaning works. The to-PE adhesive strength is more preferably 8 N/25 mm or less (e.g. 5 N/25 mm or less, typically 4 N/25 mm or less). With a sticky cleaner with low to-PE adhesive strength, great ease of unwinding can be realized when, for instance, it comprises a PSA sheet roll having a support substrate whose backside is formed of PE. From the standpoint of catching dirt and preventing the dirt from falling, the lower limit of the to-PE adhesive strength is preferably 1 N/25 mm or greater (e.g. 2 N/25 mm or greater). The to-PE adhesive strength is determined by the same method as for the to-SUS adhesive strength, but using a PE plate in place of the stainless steel plate as the adherend. The same applies to the working examples described later.

When the sticky cleaner disclosed herein has a PSA sheet roll, it is preferable that the PSA sheet roll has well-balanced adhesive strength (typically the 180° peel strength) and unwinding force so as to prevent the occurrence of rail drawing on areas (e.g. floors and carpets) being cleaned. Here, the unwinding force refers to the force required to withdraw the PSA sheet from the PSA sheet roll (i.e. the resistive force against unwinding, also perceived as the adhesive strength to the back face of the PSA sheet (typically to the backside of the support substrate). For instance, when the unwinding force is excessively low as compared with the adhesive strength, if the PSA sheet roll is rotated on an area to be cleaned, the unwinding force may succumb to the adhesive strength between the PSA sheet (typically a PSA layer) and the surface, causing rail drawing. On the other hand, an excessively high unwinding force tends to result in unsmooth unwinding of the PSA sheet.

The unwinding force can be assessed as follows. In particular, the PSA sheet roll is set in a prescribed tensile tester. In an environment at a temperature of 23° C. and 50% RH, the outer circumferential end of the wound PSA sheet is mounted to the chuck of the tester and pulled at a rate of 300 mm/min to unwind the PSA sheet roll in the tangential direction. The unwinding force during this can be converted to and determined as the value per width (e.g. 160 mm) of PSA layer of the PSA sheet (N/160 mm) A preferable PSA sheet roll has an unwinding force of about 0.5 N/160 mm to 10.0 N/160 mm (e.g. 0.5 N/160 mm to 8.0 N/160 mm, typically 0.5 N/160 mm to 7.0 N/160 mm). In the working Examples described later, the unwinding force is determined by the same method.

<PSA>

The PSA constituting the catcher (typically a PSA sheet) disclosed herein is not particularly limited. For instance, a preferable catcher satisfies properties (A1) and (B1). Examples of the PSA include rubber based PSA, acrylic PSA, urethane-based PSA and silicone-based PSA. From the standpoint of the adhesive properties and the cost, a rubber-based PSA or an acrylic PSA can be preferably used. In particular, from the standpoint of satisfying the properties (A1) and (B1), an acrylic PSA is particularly preferable.

Examples of the rubber-based PSA include a PSA that comprises, as the base polymer, one, two or more species among natural rubber-based polymers including natural rubber and modified products thereof, isoprene rubber, chloroprene rubber, styrene-isoprene-styrene block copolymer, styrene-butadiene-styrene block copolymer, and styrene-ethylene/butylene-styrene block copolymer.

A preferable acrylic PSA comprises an acrylic polymer as the base polymer. The acrylic polymer can be synthesized from a starting monomer mixture comprising an acrylic monomer as the primary monomer. Here, the acrylic monomer refers to a monomer having at least one (meth)acryloyl group in one molecule. The primary monomer refers to a monomer that accounts for 50% by weight or more (e.g. 70% by weight or more, typically 80% by weight or more) of the total monomer content (starting monomers).

As used herein, the acrylic monomer encompasses a monomer and an oligomer having a (meth)acrylic acid structure or a (meth)acrylic acid ester structure.

As used herein, the term "(meth)acrylate" comprehensively refers to acrylate and methacrylate. Similarly, the term "(meth)acryloyl" comprehensively refers to acryloyl and methacryloyl; "(meth)acryl," acryl and methacryl.

As used herein, the base polymer refers to the primary component (a component accounting for the highest percentage) among polymers, the primary adhesive component. Based on non-volatiles, the base polymer content in the PSA disclosed herein is preferably about 50% by weight or higher (e.g. 70% by weight or higher, typically 90% by weight or higher). The upper limit of the base polymer content can be 100% by weight or lower (e.g. 99% by weight or lower).

As the PSA constituting the catcher (typically a PSA sheet) disclosed herein, it is preferable to use two or more species of PSA including a PSA for catching oily dirt (an oily-dirt-catching PSA) and a PSA for catching an aqueous dirt (an aqueous-dirt-catching PSA). For instance, by placing both the oily-dirt-catching PSA and the aqueous-dirt-catching PSA to form the adhesive surface of the sticky cleaner, the properties (A1) and (B1) can be preferably obtained.

(Oily-Dirt-Catching PSA)

Examples of the oily-dirt-catching PSA disclosed herein include rubber-based PSA, acrylic PSA, urethane-based PSA and silicone-based PSA. From the standpoint of the adhesive properties and the cost, a rubber based PSA or an acrylic PSA can be preferably used. In particular, an acrylic PSA is especially preferable.

With respect to a possible acrylic PSA used in the oily-dirt-catching PSA, the acrylic polymer as the base polymer can be synthesized from a starting monomer mixture that comprises, as the primary monomer, an alkyl (meth)acrylate having an alkyl group.

As the alkyl (meth)acrylate, for instance, a compound represented by the next formula can be favorably used:

$$CH_2=CR^1COOR^2$$

Here, $R^1$ in the formula is a hydrogen atom or a methyl group. $R^2$ is an acrylic alkyl group having 1 to 20 carbon atoms (hereinafter, such a range of the number of carbon atoms may be indicated as "$C_{1-20}$"). From the standpoint of the storage elastic modulus of the PSA, etc., an alkyl (meth)acrylate having a $C_{1-14}$ (e.g. $C_{1-10}$) alkyl group is preferable, and an alkyl (meth)acrylate having a $C_{4-9}$ alkyl group is preferable. From the standpoint of the ease of catching oily dirt, $R^2$ is preferably an alkyl group having 5 or more (typically 8 or more) carbon atoms. The alkyl group can be linear or branched.

Examples of the alkyl (meth)acrylate having a $C_{1-20}$ alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isoamyl (meth)acrylate, neopentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, bornyl (meth)acrylate, isobornyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate. These alkyl (meth)acrylates may be used solely as one species or in a combination of two or more species. Preferable examples include 2-ethylhexyl acrylate (2EHA) and isononyl acrylate. Between them, 2EHA is more preferable.

The primary monomer content in all monomers is preferably 60% by weight or greater, more preferably 80% by weight or greater, or yet more preferably 90% by weight or greater. The maximum primary monomer content is not particularly limited, but is usually preferably 99% by weight or less (e.g. 98% by weight or less, typically 95% by weight or less). The acrylic polymer can be a polymerization product of essentially just the primary monomer.

To enhance various properties such as easy-release properties, the starting monomer mixture used to obtain the acrylic polymer may further comprise, in addition to the primary monomer, a secondary monomer copolymerizable with the primary monomer. The secondary monomer includes not only a monomer, but also an oligomer. Such secondary monomers include a monomer having a functional group (or a "functional group-containing monomer" hereinafter). The functional group-containing monomer can be added to incorporate crosslinking points into the acrylic polymer and increase the cohesive strength of the acrylic polymer. Such functional group-containing monomers include carboxy-group-containing monomers, acid-anhydride-group-containing monomers, hydroxy-group-containing monomers, amide-group-containing monomers, amino-group-containing monomers, monomers having nitrogen atom-containing rings, epoxy (glycidyl) group-containing monomers, alkoxy-group-containing monomers, alkoxysilyl-group-containing monomers, and sulfonate group-containing monomers. These can be used singly as one species or in a combination of two or more species. For the abilities to favorably introduce crosslinking points into the acrylic polymer and further increase the cohesive strength of the acrylic polymer, a monomer having a functional group such as a carboxy group, hydroxy group and epoxy group is preferable. A carboxy group or hydroxy group is more preferable.

Examples of carboxy-group-containing monomers include ethylenic unsaturated monocarboxylic acids such as acrylic acid, methacrylic acid, crotonic acid, carboxyethyl (meth)acrylate, and carboxypentyl (meth)acrylate; and ethylenic unsaturated dicarboxylic acids such as itaconic acid, maleic acid, fumaric acid, and citraconic acid. Among these, acrylic acid and methacrylic acid are preferable, and acrylic acid is especially preferable.

Examples of acid-anhydride-group-containing monomers include acid anhydrides of the ethylenic unsaturated dicarboxylic acids listed above such as maleic acid anhydride, and itaconic acid anhydride.

Examples of hydroxy-group-containing monomers include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate; and unsaturated alcohols such as N-methylol(meth)acrylamide, vinyl alcohol, allyl alcohol, 2-hydroxyethyl vinyl ether, 4-hydroxybutyl vinyl ether, and diethylene glycol monovinyl ether.

Examples of amide-group-containing monomers include (meth)acrylamide, N,N-dimethyllmeth)acrylamide, N-butyl (meth)acrylamide, N-methylollmeth)acrylamide, N-methylolpropane(meth)acrylamide, N-methoxymethyl(meth)acrylamide, and N-butoxymethyl(meth)acrylamide.

Examples of amino-group-containing monomers include aminoethyl (meth)acrylate, N,N-dimethylaminoethyl (meth) acrylate, and t-butylaminoethyl (meth)acrylate.

Examples of monomers having nitrogen atom-containing rings include N-vinyl-2-pyrrolidone, N-methylvinylpyrrolidone, N-vinylpyridine, N-vinylpiperidone, vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloyl morpholine.

Examples of epoxy (glycidyl) group-containing monomers include glycidyl (meth)acrylate, methylglycidyl (meth) acrylate, and allyl glycidyl ether.

Examples of alkoxy-group-containing monomers include methoxyethyl (meth)acrylate, ethoxyethyl (meth)acrylate.

Examples of alkoxysilyl-group-containing monomers include 3-(meth)acryloxypropyltrimethoxysilane, 3-(meth) acryloxypropyltriethoxysilane, 3-(meth)acryloxypropylmethyldimethoxysilane, and 3-(meth)acryloxypropylmethyldiethoxysilane.

Examples of sulfonate group-containing monomers include sodium vinyl sulfonate, sodium styrene sulfonate, and sodium 2-acrylamido-2-methylpropane sulfonate.

When the functional group-containing monomer is used as a monomer forming the acrylic polymer, the functional group-containing monomer (preferably a carboxyl group-containing monomer) is preferably added in an amount of 1% to 10% by weight (e.g. 2% to 8% by weight, typically 3% to 7% by weight) of the total monomer content.

To increase the cohesive strength of the acrylic polymer, etc., as the secondary monomer, other monomer(s) may be included besides the functional-group-containing monomer. Examples of the other monomer(s) include vinyl-ester-based monomers such as vinyl acetate, and vinyl propionate; and aromatic vinyl compounds such as styrene, substituted styrenes (α-methyl styrene, etc.), and vinyl toluene.

The method for polymerizing the monomers or a mixture thereof is not particularly limited. A heretofore known general polymerization method can be used. Examples of the polymerization method include solution polymerization, emulsion polymerization, bulk polymerization, and suspension polymerization. In particular, solution polymerization is preferable. The embodiment of the polymerization is not particularly limited. It can be carried out with suitable selection of a heretofore known monomer supply method, polymerization conditions (temperature, time, pressure, etc.), and other components (polymerization initiator, surfactant, etc.) used besides the monomer(s). For instance, as the method for supplying the monomers, the monomer mixture can be supplied to a reaction vessel all at once (all-at-once supply), supplied by gradual dropwise addition (gradual supply), or supplied in several portions every certain time (portion-wise supply). The monomers or the mixture thereof can be supplied as a solution or dispersion in which part or all is dissolved in a solvent or emulsified in water.

The polymerization initiator is not particularly limited. Examples include an azo-based initiator such as 2,2'-azobisisobutylonitrile; a peroxide-based initiator such as benzoyl peroxide; a substituted ethane-based initiator such as phenyl-substituted ethane; and a redox-based initiator by a combination of a peroxide and a reducing agent such as a combination of a peroxide and sodium ascorbate. The amount of polymerization initiator used can be suitably selected in accordance with the species of polymerization initiator, the monomer species (the composition of the monomer mixture) and so on. It is usually suitably selected from a range of, for instance, about 0.005 part to 1 part by weight to 100 parts by weight of all the monomers. The polymerization temperature can be, for example, around 20° C. to 100° C. (typically 40° C. to 80° C.).

To the PSA composition, a crosslinking agent is preferably added. For instance, favorable examples of crosslinking agents for acrylic PSA include organometallic salts such as zinc stearate and barium stearate, epoxy-based crosslinking agents, and isocyanate-based crosslinking agents. Oxazoline-based crosslinking agents, aziridine-based crosslinking agents, metal chelate-based crosslinking agents and melamine-based crosslinking agents can be used as well. These crosslinking agents can be used singly as one species or in a combination of two or more species. In particular, for the ability to favorably cross-link carboxy groups, the ease of obtaining great workabilities (typically ease of release) and the excellent acid resistance, epoxy-based crosslinking agents, and isocyanate-based crosslinking agents are preferable. Isocyanate-based crosslinking agents are particularly preferable. The amount of the crosslinking agent added is not particularly limited. To obtain an adhesive strength in the aforementioned favorable numerical range, to 100 parts by weight of the base polymer (e.g. an acrylic polymer), it can be 0.01 part to 10 parts by weight (e.g. 0.05 part to 5 parts by weight, typically 0.1 part to 5 parts by weight).

When a solvent-based PSA is used, favorable examples of the solvent used include aliphatic hydrocarbons such as hexane, butane and mineral spirit alicyclic hydrocarbons such as cyclohexane; aromatic hydrocarbons such as toluene, xylene, solvent naphtha, tetralin, and dipentene; alcohols such as butanol, isobutanol, cyclohexanol, 2-methylcyclohexanol, and tridecanol; esters such as methyl acetate, ethyl acetate, isopropyl acetate, and butyl acetate; and ketones such as acetone and methyl ethyl ketone.

The molecular weight (Mw: weight average molecular weight) of the base polymer (e.g. an acrylic polymer) used (synthesized) is not particularly limited, but a polymer (e.g., an acrylic polymer) having a weight average molecular weight (Mw) of about $30 \times 10^4$ to $100 \times 10^4$ can be favorably used.

The oily dirt-catching PSA disclosed herein may comprise, as its base polymer, an acrylic block copolymer having a hard segment (A) (or a "A-block" hereinafter) and a soft segment (B) (or a "B-block" hereinafter) in one molecule. In the structure of the acrylic block copolymer, the hard segment (A) refers to the relatively hard block in relation to the soft segment (B) in the acrylic copolymer. The soft segment (B) refers to the relatively soft block in relation to the hard segment (A) in the structure of the acrylic block copolymer.

The acrylic block copolymer may show characteristics of thermoplastic polymers (typically thermoplastic elastomers). The PSA disclosed herein comprises the acrylic block copolymer as the base polymer and thus may be a PSA suited for hot melt application (i.e. a hot melt PSA). The hot melt PSA is preferable from the standpoint of reducing environmental stress, etc., because the amount of organic solvents used can be reduced as compared with a general organic solvent-based acrylic PSA (typically a PSA comprising, as the base polymer, a random copolymer synthesized from starting monomers including an acrylic monomer as the primary monomer by solution polymerization).

Herein, the acrylic block copolymer refers to a polymer having a block structure that comprises, as a monomer unit (monomeric component) constituting the copolymer, a monomer unit derived from a monomer having at least one (meth)acryloyl group per molecule (or an "acrylic monomer" hereinafter). In other words, it refers to a block copolymer comprising a monomer unit derived from an acrylic monomer. For instance, in a preferable acrylic block copolymer, at least 50% by weight of all monomer units are derived from an acrylic monomer. Such an acrylic block copolymer can be preferably synthesized from starting monomer(s) comprising, as the primary monomer, an alkyl (meth)acrylate having an alkyl group.

A preferable acrylic block copolymer comprises at least one acrylate block (which hereinafter may be referred to as an Ac block) and at least one methacrylate block (which hereinafter may be referred to as an MAc block). For instance, a preferable block copolymer has a structure in which Ac blocks and MAc blocks are positioned alternately. The total block number of Ac blocks and MAc blocks comprised in one polymer molecule can be about 2.5 to 5 in average (e.g. about 2.7 to 3.3, typically about 3).

In typical, the Ac block preferably comprises an alkyl acrylate as the primary monomer. In other words, 50% by mass or more of all monomeric units constituting the Ac block are preferably monomer units derived from an alkyl acrylate. 75% by weight or more (e.g. 90% by weight or more) of the monomer units can be derived from an alkyl acrylate as well. In a preferable embodiment, the Ac block in the acrylic block copolymer is a polymer essentially formed of one, two or more species (typically one species) of alkyl acrylate. Alternatively, the Ac block may be a copolymer of an alkyl acrylate and other monomer (e.g. an alkyl methacrylate, etc.).

An example of the Ac block-constituting alkyl acrylate is an alkyl acrylate having 1 to 20 (preferably 4 to 14, e.g. 6 to 12) carbon atoms in its alkyl group. Examples include methyl acrylate, ethyl acrylate, n-propyl acrylate, isopropyl acrylate, n-butyl acrylate (BA), isobutyl acrylate, tert-butyl acrylate, n-pentyl acrylate, n-hexyl acrylate, n-heptyl acrylate, n-octyl acrylate, 2-ethylhexyl acrylate (2EHA), nonyl acrylate, isononyl acrylate, decyl acrylate, dodecyl acrylate, stearyl acrylate, etc. These can be used singly as one species or in a combination of two or more species.

In a preferable embodiment, 50% by weight or more of monomers constituting the Ac block is an alkyl acrylate having 4 to 14 carbon atoms in its alkyl group. The ratio of alkyl acrylate having 4 to 14 carbon atoms in alkyl group can be 75% by weight or greater or can be essentially 100% by weight. For instance, it is preferable to use a structure in which the monomer unit(s) constituting the Ac block essentially consist of BA or 2EHA, or comprise the two species, BA and 2EHA, and so on. From the standpoint of the ease of catching oily dirt, a preferable Ac block is formed of an alkyl acrylate whose alkyl group has 5 or more (typically 8 or more) carbon atoms in such a proportion.

It is typically preferable that the MAc block comprises an alkyl methacrylate as the primary monomer. Of all the monomer units constituting the MAc, 75% by weight or more (e.g. 90% by weight or more) can be derived from an alkyl methacrylate. In a preferable embodiment, the MAc block in the acrylic block copolymer is essentially formed of one, two or more species (typically one species) of alkyl methacrylate. Alternatively, the MAc block may be a copolymer of an alkyl methacrylate and other monomer (e.g., an alkyl acrylate).

The alkyl methacrylate constituting the MAc block may be an alkyl methacrylate whose alkyl group has 1 to 20 (preferably 1 to 14) carbon atoms. Specific examples thereof include methyl methacrylate, ethyl methacrylate, n-propyl methacrylate, isopropyl methacrylate, n-butyl methacrylate, isobutyl methacrylate, tert-butyl methacrylate, n-pentyl methacrylate, n-hexyl methacrylate, n-heptyl methacrylate, n-octyl methacrylate, 2-ethylhexyl methacrylate, nonyl methacrylate, isononyl methacrylate, decyl methacrylate, dodecyl methacrylate, stearyl methacrylate, etc. These can be used singly as one species or in a combination of two or more species.

In a preferable embodiment, 50% by weight or more of the monomers constituting the MAc block is an alkyl methacrylate having an alkyl group with 1 to 4 (preferably 1 to 3) carbon atoms. The ratio of the alkyl methacrylate having 1 to 4 carbon atoms in its alkyl group can be 75% by weight or greater, or essentially 100% by weight. Especially preferable alkyl methacrylates include methyl methacrylate (MMA) and ethyl methacrylate (EMA). For example, the monomers preferably employed may consist essentially of MMA alone, EMA alone, both MMA and EMA, or the like.

The acrylic block copolymer may be a copolymer comprising A blocks (hard segments (A)) and B blocks (soft segments (B)) positioned alternately such as AB structure, ABA structure, ABAB structure, ABABA structure, etc., with the A block having been formed of a polymer having a rigid structure with excellent cohesive strength and elasticity, and the B block having been formed of a polymer having a flexible structure with excellent viscosity. A PSA comprising as its base polymer an acrylic block copolymer having such a structure may form a PSA layer combining cohesive strength and elasticity as well as viscosity at high levels. A PSA having such a composition can be preferably used as a hot melt PSA. An acrylic block copolymer having a structure (such as ABA structure, ABABA structure, etc.) with A blocks at both termini of the molecule can be preferably used. An acrylic block copolymer having such a structure is preferable because it is likely to have a good balance of cohesion and thermoplasticity.

When the acrylic block copolymer comprises two or more A blocks, the compositions, molecular weights (polymerization degrees), structures, etc., of these A blocks can be the same with or different from each other. When the acrylic block copolymer comprises two or more B blocks, the same applies to the B blocks.

As the A block, an MAc block as those described above can be preferably used. As the B block, an Ac block as those described above can be preferably used. In a preferable embodiment, the acrylic block copolymer is a triblock copolymer having a structure of MAc-Ac-MAc (ABA structure). For instance, can be preferably used a triblock copolymer with two MAc blocks having essentially identical monomer compositions.

The weight ratio of hard segment (A) to soft segment (B) is not particularly limited in the acrylic block copolymer. For instance, the weight ratio (A/B) of hard segment (A) to soft segment (B) can be in a range of 4/96 to 90/10, or it is usually suitably in a range of 7/93 to 70/30 or preferably in a range of 10/90 to 50/50 (e.g. 15/85 to 40/60). In the acrylic block copolymer comprising two or more hard segments (A), the ratio of total weight of these hard segments (A) to weight of soft segment (B) is preferably in these ranges. The same applies to the acrylic block copolymer comprising two or more soft segments (B). When the ratio of hard segment (A) (e.g. MAc block) is high, the adhesive strength tends to decrease, likely providing easy-release properties. When the ratio of soft segment (B) (e.g. Ac block) is high, the oily dirt-catching ability tends to increase.

In the art disclosed herein, the weight average molecular weight (Mw) of the acrylic block copolymer is not particularly limited. For instance, a species having a Mw of about $3 \times 10^4$ to $30 \times 10^4$ can be preferably used. Usually, the acrylic block copolymer has a Mw in a range of preferably about $3.5 \times 10^4$ to $25 \times 10^4$ or more preferably in a range of about $4 \times 10^4$ to $20 \times 10^4$ (e.g., $4.5 \times 10^4$ to $15 \times 10^4$). A higher Mw of the acrylic block copolymer is advantageous from the standpoint of increasing the adhesive properties (e.g. cohesion) and increasing the oily dirt-catching ability. On the other hand, a low Mw of the acrylic block copolymer is advantageous from the standpoint of reducing the viscosity (melt viscosity) of the PSA. Lower melt viscosity of the PSA is particularly meaningful when the PSA is a hot melt type. The Mw of the acrylic block copolymer described here refers to the value based on standard polystyrene determined by gel permeation chromatography (GPC) with respect to a sample prepared by dissolving the copolymer in a suitable solvent (e.g., tetrahydrofuran (THF)).

In the acrylic block copolymer in the art disclosed herein, a monomer (other monomer) other than an alkyl acrylate and an alkyl methacrylate may be copolymerized. Examples of the other monomer include vinyl compounds having functional groups such as alkoxy group, epoxy group, hydroxyl group, amino group, amide group, cyano group, carboxyl group, acid anhydride group, etc.; vinyl esters such as vinyl acetate; aromatic vinyl compounds such as styrene; vinyl group-containing heterocyclic compounds such as N-vinylpyrrolidone and the like. Alternatively, it can be an alkyl acrylate having a structure with an acryloyl group coupled to a fluorinated alkyl group, a fluorinated alkyl acrylate and a fluorinated alkyl methacrylate. The other monomer may be used, for instance, to adjust the PSA's properties (adhesive properties, ease of molding, etc.) and its content is suitably 20% by weight or less (e.g. 10% by weight or less, typically 5% by weight or less) of all the monomers constituting the acrylic block copolymer. In a preferable embodiment, the acrylic block copolymer is essentially free of the other monomers.

Such an acrylic block copolymer can be synthesized by a known method (e.g. see Japanese Patent Application Publication Nos. 2001-234146 and H11-323072), or a commercial product is readily available. Examples of the commercial product include trade name "LA POLYMER" series (e.g., those with product numbers LA2140e, LA2250, etc.) available from Kuraray Co., Ltd., trade name "NABSTAR" available from Kaneka Corporation, and the like. As the method for synthesizing the acrylic block copolymer, living polymerization method can be preferably employed. According to living polymerization, while keeping the weatherability inherent in the acrylic polymer, because of the excellent structure control unique to the living polymerization, an acrylic block copolymer having excellent thermoplasticity can be synthesized. Since the molecular weight distribution can be controlled in a narrow range, insufficient cohesion caused by the presence of low molecular weight components can be reduced to obtain an easily releasable PSA (and thereby a PSA sheet (a catcher)).

When the PSA (e.g. a PSA layer) in the art disclosed herein comprises an acrylic block copolymer, solely one species or a combination of two or more species of acrylic block copolymer can be used. In addition to the acrylic block copolymer, to control the adhesive properties, etc., it may comprise, as an optional component, a component other than an acrylic block copolymer. Examples of the optional component include a polymer and an oligomer excluding acrylic block copolymers. The amount of the polymer or oligomer (or "optional polymer" hereinafter) is suitably 50 parts by weight or less relative to 100 parts by weight of the acrylic block copolymer, preferably 10 parts by weight or smaller, or more preferably 5 parts by weight or smaller. In a preferable embodiment, the PSA layer may be essentially free of polymers other than the acrylic block copolymer.

The oily dirt-catching PSA disclosed herein may include a tackifier as necessary. As the tackifier, tackifier resins commonly known in the field of PSA and the like can be used. Examples include a hydrocarbon-based tackifier resin, terpene-based tackifier resin, rosin-based tackifier resin, phenolic tackifier resin, epoxy-based tackifier resin, polyamide-based tackifier resin, elastomer-based tackifier resin and ketone-based tackifier resin. These can be used singly as one species or in a combination of two or more species.

Examples of the hydrocarbon-based tackifier resin include various hydrocarbon-based resins such as aliphatic hydrocarbon resins, aromatic hydrocarbon resins (xylene resins, etc.), alicyclic hydrocarbon resins, aliphatic-aromatic petroleum resins (styrene-olefin-based copolymers, etc.), aliphatic-alicyclic petroleum resins, hydrogenated hydrocarbon resins, coumarone-based resins, coumarone-indene-based resins, and the like. Examples of the terpene-based tackifier resin include terpene-based resins such as α-pinene polymers, β-pinene polymers, etc.; modified terpene-based resins (e.g. terpenophenolic resins, styrene-modified terpene-based resins, hydrogenated terpene-based resins, hydrogenated terpenophenolic resins, etc.) obtained by subjecting these terpene-based resins to modification (phenol modification, aromatic modification, hydrogenation modification, etc.); and so on. Examples of the rosin-based tackifier resin include unmodified rosins (raw rosins) such as gum rosin, wood rosin, etc.; modified rosins (hydrogenated rosins, disproportioned rosins, polymerized rosins, other chemically modified rosins, etc.) obtained by subjecting these unmodified rosins to hydrogenation, disproportionation, polymerization, etc.; various other rosin derivatives; and so on. Examples of phenolic tackifier resins include resol-type and novolac-type alkylphenolic resins. Preferable tackifiers among these are terpene-based resins, modified terpene-based resins and alkylphenolic resins.

The softening point of the tackifier resin is not particularly limited From the standpoint of increasing the adhesive strength thereby to obtaining oily-dirt-catching abilities, it is preferably 160° C. or lower, or more preferably 140° C. or lower. From the standpoint of avoiding an excessive increase in adhesive strength, it is preferably 60° C. or higher, or more preferably 80° C. or higher. The softening point of the tackifier resin referred to here is defined as the value determined by the softening point test method (ring and ball method) specified in either JIS K 5902 or JIS K 2207.

The amount of tackifier added is not particularly limited. From the standpoint of avoiding an excessive increase in adhesive strength, for instance, to 100 parts by weight of the base polymer (e.g. acrylic copolymer), it can be 50 parts by weight or less, or it is usually suitably 40 parts by weight or less, or preferably 30 parts by weight or less. From the standpoint of obtaining greater effects of the tackifier, the amount added to 100 parts by weight of the base polymer is suitably, for instance, 1 part by weight or greater. Alternatively, the PSA may be essentially free of such a tackifier.

(Moist/Wet-Dirt-Catching PSA)

Examples of the moist/wet-dirt-catching PSA disclosed herein include rubber-based PSA, acrylic PSA, urethane-based PSA and silicone-based PSA. From the standpoint of the adhesive properties and the cost, a rubber based PSA or an acrylic PSA can be preferably used. In particular, an acrylic PSA is especially preferable.

With respect to an acrylic PSA possibly used in the moist/wet-dirt-catching PSA, the acrylic polymer as the base polymer can be synthesized from a starting monomer mixture comprising an acrylic monomer as the primary monomer. Examples of the starting monomer mixture comprising the acrylic monomer include an alkoxy group-containing monomer, carboxy group-containing monomer, alkyl (meth) acrylates, acid anhydride group-containing monomer, hydroxy group-containing monomer, amide group-containing monomer, amino group-containing monomer, monomer having a nitrogen atom-containing ring, epoxy (glycidyl) group-containing monomer, alkoxysilyl group-containing monomer, sulfonate group-containing monomer, vinyl ester-based monomer, and aromatic vinyl compound. These can be used singly as one species or in a combination of two or more species.

Specific examples of the alkoxy group-containing monomer include alkoxy polyalkylene glycol (meth)acrylates (more specifically alkoxy polyethylene glycol (meth)acrylates) such as methoxy polyethylene glycol (meth)acrylate, ethoxy polyethylene glycol (meth)acrylate, and butoxy polyethylene glycol (meth)acrylate; and alkoxyalkyl (meth)acrylates such as methoxyethyl (meth)acrylate, ethoxyethyl (meth)acrylate and butoxy (meth)acrylate. These can be used singly as one species or in a combination of two or more species. As the alkoxyalkyl (meth)acrylate, an alkoxyalkyl (meth)acrylate having a alkoxy group with one to four (more preferably one or two) carbon atoms.

Examples of the carboxy group-containing monomer include ethylenic unsaturated monocarboxylic acids such as acrylic acid, methacrylic acid, crotonic acid, carboxymethyl (meth)acrylate, and carboxypentyl (meth)acrylate; and ethylenic unsaturated dicarboxylic acids such as itaconic acid, maleic acid, fumaric acid and citraconic acid. A caprolactone adduct of (meth)acrylic acid can also be preferably used.

In particular, the caprolactone adduct of (meth)acrylic acid is preferably a caprolactone (meth)acrylate represented by the next formula (1):

[Chem 1]

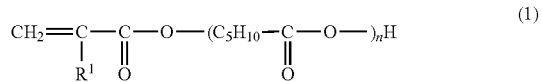

(in the formula (1), $R^1$ is a hydrogen atom or a methyl group and n is between 1 and 10). More preferably, in the formula (1), $R^1$ is a hydrogen atom and n is between 1 and 5. When a caprolactone adduct of (meth)acrylic acid and other carboxy group-containing monomer (e.g. acrylic acid and methacrylic acid) are used together as carboxy group-containing monomers, the ratio of the (meth)acrylic acid-caprolactone adduct in the total amount of the carboxy group-containing monomers (e.g. acrylic acid and methacrylic acid) is preferably 50% by weight or higher (e.g. 70% by weight or higher, typically 90% by weight or higher). Essentially all of the carboxy group-containing monomers can be the (meth)acrylic acid-caprolactone adduct. In other words, the acrylic polymer of the moist/wet-dirt-catching PSA in the art disclosed herein can be produced in an embodiment using no carboxy group-containing monomers besides the (meth)acrylic acid-caprolactone adduct.

As for the alkyl (meth)acrylate, acid anhydride group-containing monomer, hydroxy group-containing monomer, amide group-containing monomer, amino group-containing monomer, monomer having a nitrogen atom-containing ring, epoxy (glycidyl) group-containing monomer, alkoxysilyl group-containing monomer, sulfonate group-containing monomer, vinyl ester-based and aromatic vinyl compound, those exemplified with respect to the oily-dirt-catching PSA can be preferably used.

When the acrylic polymer possibly used in the moist/wet-dirt-catching PSA disclosed herein comprises an alkoxy group-containing monomer and/or a carboxy group-containing monomer as monomers, the combined copolymerization ratio of the alkoxy group-containing monomer and the carboxy group-containing monomer in the acrylic polymer is preferably 15% by weight or higher. This provides hydrophilicity to the polymer to enhance adhesion of moist/wet crumbs, and greater water-swelling abilities enhance retention of collected moist/wet crumbs. The combined copolymerization ratio of the alkoxy group-containing monomer and the carboxy group-containing monomer in the acrylic polymer is more preferably 50% by weight or higher (e.g. 80% by weight or higher, typically 90% by weight or higher). The maximum combined copolymerization ratio of the alkoxy group-containing monomer and the carboxy group-containing monomer is not particularly limited. It should just be 100% by weight or lower. For instance, it can be 95% by weight or lower (typically 85% by weight or lower). As used herein, the copolymerization ratio of each monomer in a polymer corresponds (equals) to the ratio of the monomer in the starting monomer mixture used to synthesize the polymer.

When the acrylic polymer is a copolymer of an alkoxy group-containing monomer and a carboxy group-containing monomer, the weight ratio (alkoxy group-containing monomer:carboxy group-containing monomer) of the alkoxy group-containing monomer (e.g. an alkoxyalkyl (meth)acrylate, in particular, methoxyethyl acrylate) to the carboxy group-containing monomer (e.g. a (meth)acrylic acid-caprolactone adduct, in particular, caprolactone acrylate) is not particularly limited. It can be, for instance, 3:7 to 8:2 (typically 5:5 to 7:3).

When the acrylic polymer is a copolymer of an alkoxy group-containing monomer and a carboxy group-containing monomer, other monomer(s) copolymerizable with the alkoxy group-containing monomer and/or the carboxy group-containing monomer may be copolymerized in the acrylic polymer for purposes such as increasing the adhesive strength and increasing the cohesive strength by introducing cross-linking points. Examples of the other copolymerizable monomers include the various types of monomers (alkyl (meth)acrylates, acid anhydride group-containing monomer, hydroxy group-containing monomer, amide group-containing monomers, amino group-containing monomers, monomers having nitrogen atom-containing rings, epoxy group-containing monomers, alkoxysilyl group-containing monomers, sulfonate group-containing monomers, vinyl ester-based monomers, aromatic vinyl compounds, etc.).

When the copolymerizable other monomer(s) are used, the copolymerization ratio of the other monomer(s) in the acrylic polymer can be about 85% by weight or lower (e.g. 50% by weight or lower, typically 20% by weight or lower, or even 10% by weight or lower). The minimum copolymerization ratio can be, for instance, 5% by weight or higher (typically 15% by weight or higher). The acrylic polymer may be synthesized from a starting monomer mixture essentially free of the other copolymerizable monomers.

Similarly to the acrylic polymer possibly used in the oily-dirt-catching PSA, the method for polymerizing the monomers or a mixture thereof is not particularly limited, either. Solution polymerization is, however, preferable. The type of polymerization initiator, its amount used, the polymerization temperature, etc., can be suitably selected from the same ranges as for the acrylic polymer possibly used in the oily-dirt-catching PSA described earlier. As the polymerization initiator, an azo-based initiator is preferably used.

To the PSA composition, a crosslinking agent is preferably added. For instance, as the crosslinking agent for acrylic PSA, one, two or more species can be preferably used among those exemplified with respect to the oily-dirt-catching PSA. In particular, for the abilities to preferably undergo crosslinking with the carboxy group and to easily provide good workability (typically easy-release nature) and further for the excellent acid resistance, epoxy-based crosslinking agents and isocyanate-based crosslinking agents are preferable; and an epoxy-based crosslinking agent is particularly preferable.

A specific example of the epoxy-based crosslinking agent is a species having two or more epoxy groups (glycidyl groups) per molecule. Examples of such epoxy-based crosslinking agents include bisphenol A-epichlorohydrin-based epoxy resin, sorbitol polyglycidyl ether, polyglycerol polyglycidyl ether, pentaerythritol polyglycidyl ether, diglycerol polyglycidyl ether, glycerol polyglycidyl ether, trimethylolpropane polyglycidyl ether, neopentyl glycol diglycidyl ether, 1,6-hexanediol diglycidyl ether, ethylene glycol diglycidyl ether, diethylene glycol diglycidyl ether, polyethylene glycol diglycidyl ether, propylene glycol diglycidyl ether, polypropylene glycol diglycidyl ether, diglycidylaniline, N,N,N,N-tetraglycidyl-m-xylenecliamine, and 1,3-bis(N,N-diglycidylaminomethybcyclohexane. Among them, from the standpoint of the water-swelling properties upon the crosslinking, polyethylene glycol diglycidyl ether is preferable.

The amount of the crosslinking agent added is not particularly limited. From the standpoint of obtaining good adhesive strength and enhancing the ease of catching aqueous dirt while having water swelling properties upon crosslinking in adequate ranges, it is preferably about 0.01 part to 10 parts by weight (e.g. 0.05 part to 5 parts by weight, typically 0.1 part to 5 parts by weight) to 100 parts by weight of the base polymer (e.g. an acrylic polymer).

Examples of the solvent used include water; alcohols such as methanol, ethanol, butanol, isobutanol, cyclohexanol, 2-methylcyclohexanol, and dodecanol; aliphatic hydrocarbons such as hexane, heptane and mineral spirit alicyclic hydrocarbons such as cyclohexane; aromatic hydrocarbons such as toluene, xylene, solvent naphtha, tetralin, and dipentene; esters such as methyl acetate, ethyl acetate, isopropyl acetate, and butyl acetate; and ketones such as acetone and methyl ethyl ketone. In particular, an aqueous solvent consisting of water, a solvent mixture of water and an alcohol such as methanol, and the like are preferable.

The molecular weight (Mw: weight average molecular weight) of the base polymer (e.g. an acrylic polymer) used (synthesized) is not particularly limited. A polymer (e.g. an acrylic polymer) having a weight average molecular weight (Mw) of about $30 \times 10^4$ to $100 \times 10^4$ can be favorably used.

The moist/wet-dirt-catching PSA disclosed herein preferably comprises a water soluble plasticizer. As the water-soluble plasticizer, various polyols (preferably polyether polyol) can be used. Specific examples include polyethylene glycol, polypropylene glycol, polyoxypropylene sorbitol ether, polyglycerin, and polyoxyethylene glyceryl ether. These can be used singly as one species or in a combination of two or more species.

The amount of the water-soluble plasticizer added is not particularly limited. It is preferably about 10 parts by weight or greater (e.g. 20 parts by weight or greater, typically 30 parts by weight or greater) to 100 parts by weight of the base polymer (e.g. an acrylic polymer). This tends to enhance the ability to catch moist/wet crumbs. The maximum amount of the water-soluble plasticizer added is not particularly limited. From the standpoint of inhibiting lowering of shear force, it is preferably 100 parts by weight or less (e.g. 70 parts by weight or less, typically 50 parts by weight or less) to 100 parts by weight of the base polymer (e.g. an acrylic polymer).

The moist/wet-dirt-catching PSA disclosed herein may comprise a tackifier as necessary. As the tackifier, a tackifier resin known in the field of PSA and the like can be used. For instance, one, two or more species can be preferably used among the species exemplified with respect to the oily-dirt-catching PSA. The softening point of the tackifier resin is preferably in the same range as the softening point range of tackifier resin exemplified with respect to the oily-dirt-catching PSA. The amount of the tackifier added is not particularly limited. For instance, it can be preferably used in the same range of amounts as possible amounts of tackifier resin used in the oily-dirt-catching PSA. Alternatively, the moist/wet-dirt-catching PSA may be essentially free of a tackifier.

(Common Features)

The PSA composition (PSA, or PSA layer, including oily-dirt-catching PSA, moist/wet-dirt-catching PSA) in the art disclosed herein can include various additives known in the PSA field as well, such as surfactant, chain transfer agent, anti-aging agent, antioxidant, UV ray absorber, photostabilizer, antistatic agent, and colorant (pigment, dye, etc.). In addition, the moist/wet-dirt-catching PSA may comprise a water-soluble polymer such as polyvinyl alcohol and polyvinylpyrrolidone, a neutralizer (ammonia water, sodium hydroxide, potassium hydroxide, etc.), etc. The types and amounts of these non-essential additives can be the same as usual types and amounts in this type of PSA.

The PSA compositions in the art disclosed herein may be essentially free of a peel strength-adjusting agent (typically a peel strength-lowering agent) such as a fatty acid. Even in such an embodiment, for instance, by adjusting the surface area ratio between the first and second PSA layers, adequate peeling abilities can be provided. From the standpoint of the dirt-catching abilities, the art disclosed herein may be implemented in an embodiment where the oily-dirt-catching PSA is essentially free of a plasticizer.

The form of the PSA (including the oily-dirt-catching PSA and the moist/wet-dirt-catching PSA) disclosed herein is not particularly limited. For instance, the PSA may be formed from a PSA composition such as an aqueous PSA composition including a water-dispersed PSA composition or a solvent-based PSA composition. A solvent-free PSA formed from an active energy ray-curable PSA composition or a hot melt PSA composition may be preferably used as well. In particular, a solvent-based PSA and a solvent-free PSA are preferable. From the standpoint of the handling properties, a hot melt PSA is preferable.

<PSA Layer>

When the PSA (e.g. a PSA layer) is formed from the PSA composition disclosed herein, the formation method is not particularly limited. For instance, it is possible to apply a method where the PSA composition is directly provided (typically applied) to a support substrate, using a heretofore known application means such as die water, gravure roll coater and the like, and allowed to dry. Alternatively, a transfer method may be employed, where the PSA composition is provided to a highly releasable surface (e.g. the surface of a release liner, the support substrate backside treated with a release agent) and allowed to dry to form a PSA layer on the surface, and the PSA layer is transferred to a support substrate. The PSA layer can be free of a substrate (substrate-free type) obtainable by providing the PSA composition to a highly-releasable surface and allowing it to dry.

When the PSA layer is formed on the surface of the support substrate, the PSA layer may be formed entirely over one face of the support substrate. Alternatively, for instance, a non-sticky region (dry edge) free of the PSA layer may be included along each edge of the support substrate's width direction. The PSA layer is typically formed continuously. Depending on the purpose and the application, it may be formed in a regular or random pattern of dots, stripes, etc. In addition, the PSA layer may have a multi-layer structure formed of two or more layers.

When the art disclosed herein is implemented in an embodiment comprising a PSA layer formed of the first PSA layer and the second PSA layer provided partially over the first PSA layer, for instance, the PSA layer can be formed by a method as follows: In particular, a PSA composition for forming the first PSA layer (e.g. an oily-dirt-catching PSA composition) is provided (typically applied) to a support substrate or a release liner (releasable support) and allowed to dry to form the first PSA layer (e.g. oily-dirt-catching PSA); separately from this, a PSA composition for forming the second PSA layer (e.g. a moist/wet-dirt-catching PSA composition) is provided (typically applied) partially to another release liner (releasable support) and allowed to dry to form the second PSA layer (e.g. moist/wet-dirt-catching PSA; it can be partially provided, using, for instance, a die having several open dot holes; and the first PSA layer supported on the support substrate or release liner and the second PSA layer supported on the second release liner are layered to fabricate a PSA sheet having a PSA layer formed of the first PSA layer and the second PSA layer provided partially over the first PSA layer.

When a hot melt PSA (a thermoplastic PSA) is used, the PSA in a heated/melted state as the PSA composition is applied and the PSA is typically allowed to cool to about room temperature to form a PSA layer. Thus, the drying process can be omitted. The first and second PSA layers can be provided in a continuous manner.

When the art disclosed herein is implemented in an embodiment using a PSA layer formed of the first PSA layer and the second PSA layer provided partially on the first PSA layer, the thickness of the first PSA layer can be suitably selected in accordance with the purpose and is not particularly limited. From the standpoint of obtaining sufficient solid dirt-catching abilities, the thickness of the first PSA layer is preferably about 5 µm or greater (e.g. 10 µm or greater, typically 15 µm or greater). From the standpoint of reduction of bulkiness and the easy-release nature, it is preferably 300 µm or less (e.g. 150 µm or less, typically 100 µm or less, or even 50 µm or less). Similarly to the thickness of the first PSA layer, the thickness of the second PSA layer can be suitably selected in accordance with the purpose and the application, and is not particularly limited. From the standpoint of obtaining sufficient solid dirt-catching abilities, the thickness of the second layer is preferably about 5 µm or greater (e.g. 10 µm or greater, typically 15 µm or greater). From the standpoint of reduction of bulkiness and the easy-release nature, it is preferably 300 µm or less (e.g. 150 µm or less, typically 100 µm or less, or even 50 am or less).

The overall thickness of the PSA layer (e.g. when having a laminate structure including first and second PSA layers, the combined thickness of the several PSA layers) can be suitably selected and is not particularly limited From the standpoint of obtaining sufficient solid dirt-catching abilities, the overall thickness of the PSA layers is preferably about 5 µm or greater (e.g. 10 µm or greater, typically 20 µm or greater). From the standpoint of reduction of bulkiness and the easy-release nature, it is preferably 300 µm or less (e.g. 150 µm or less, typically 100 µm or less, or even 60 µm or less).

<Support Substrate>

When the catcher disclosed herein comprises, for instance, a support substrate, it is possible to use a material formed of various types of synthetic resin, nonwoven fabric, woven fabric, paper and metal foil as well as a composite of these. The support substrate formed from the synthetic resin includes a resin sheet, a rubber sheet and a foam sheet.

Examples of synthetic resin include a polyolefin (polyethylene (PE), polypropylene (PP), ethylene-propylene copolymers, etc.), polyester (polyethylene terephthalate (PET), etc.), vinyl chloride resin, vinyl acetate resin, polyimide resin, polyamide resin, and fluorocarbon resin. Examples of a rubber sheet include a natural rubber sheet and a butyl rubber sheet. Examples of a foam sheet include various resin foam sheets. Examples of paper include Japanese paper (washi), Kraft paper, glassine paper, high-grade paper, synthetic paper, and top-coated paper. Examples of a fabric include a woven fabric and a non-woven fabric of a single species or a blend, etc., of various fibrous substances. Examples of the fibrous substance include cotton, staple fiber, Manila hemp, pulp, rayon, acetate fiber, polyester fiber, polyvinyl alcohol fiber, polyamide fiber, and polyolefin fiber. Examples of metal foil include aluminum foil and copper foil. The support substrate may contain as necessary various additives such as filler (inorganic filler, organic filler, etc.), anti-aging agent, antioxidant, UV ray absorber, photostabilizer, anti-static agent, lubricant, plasticizer, and colorant (pigment, dye, etc.).

The art disclosed herein can be favorably implemented in an embodiment comprising a foam sheet as the support substrate. With the use of a foam sheet as the support substrate, solid-dirt-catching abilities and prevention of fall-off will be enhanced. Specific examples of the foam sheet material include polyolefinic resin foam such as PE foam and PP foam; polyester-based resin foam such as PET foam, polyethylene naphthalate foam, and polybutylene terephthalate foam; polyvinyl chloride-based resin foam such as polyvinyl chloride foam; vinyl acetate-based resin foam; polyphenylene sulfide resin foam; amide-based resin foam such as polyamide (nylon) resin foam and wholly aromatic polyamide (aramid) resin foam; polyimide-based resin foam; polyether ether ketone (PEEK) foam; styrene-based resin foam such as polystyrene foam; and urethane-based resin foam such as polyurethane resin foam. As the foam, rubber-based resin foam such as polychloroprene rubber foam can be used as well. As the foam, closed-cell foam is preferable.

Examples of preferable foam include polyolefinic resin foam. As the plastic material forming the polyolefinic foam (i.e. as the polyolefinic resin), various known or commonly-used polyolefinic resins can be used without particular limitations. Examples include PE such as low density PE (LDPE), linear low density PE (LLDPE), high density PE (HDPE), and metallocene catalyst-based linear low density PE; PP; ethylene-propylene copolymers; and ethylene-vinyl acetate copolymers. These polyolefinic resins can be used singly as one species or in a combination of two or more species. In particular, a preferable PE-based foam sheet is essentially formed of PE-based resin foam. Here, the PE-based resin refers to a resin whose primary monomer (i.e. the primary component among monomers) is ethylene, possibly including HDPE, LDPE and LLDPE as well as an ethylene-propylene copolymer and an ethylene-vinyl acetate copolymer with more than 50% ethylene by weight (copolymerization ratio).

The density (apparent density) of the foam sheet is not particularly limited. It is usually preferably 10 kg/m³ to 200 kg/m³, or more preferably 10 kg/m³ to 100 kg/m³ (typically 15 kg/m³ to 50 kg/m³). When the density is at or above the prescribed value, the strength of the foam sheet (and further of the PSA sheet) as well as the handling properties tend to increase. On the other hand, when the density is at or below the prescribed value, the cushioning properties as well as the dirt-catching ability and anti-falling properties tend to increase. The density (apparent density) of the foam sheet can be determined by a method based on JIS K 6767:1999.

The tensile strength of the foam sheet (e.g. a polyolefinic foam sheet) is not particularly limited. For instance, the tensile strength in the length direction (MD) is preferably 0.25 MPa to 2.5 MPa (more preferably 0.3 MPa to 2.0 MPa, typically 0.5 MPa to 1.5 MPa). The tensile strength in the width direction (TD) is preferably 0.1 MPa to 1.8 MPa (more preferably 0.15 MPa to 1.2 MPa, typically 0.2 MPa to 0.6 MPa). When the tensile strength is in these ranges, the strength of the PSA sheet increases, whereby greater handling properties can be obtained. The tensile strength of the foam sheet is determined based on JIS K 6767:1999.

The elongation of the foam sheet (e.g. a polyolefinic foam sheet) is not particularly limited. For instance, the MD elongation is preferably 20% to 400% (more preferably 20% to 300%, typically 25% to 100%). The TD elongation is preferably 15% to 300% (more preferably 20% to 200%, typically 25% to 100%) An elongation in these ranges tends to bring about greater solid dirt-catching ability and strength of the PSA sheet. The elongation of the foam sheet is determined based on JIS K 6767:1999.

The tear strength of the foam sheet (e.g. a polyolefinic foam sheet) is not particularly limited. For instance, the MD tear strength is preferably 15 N/m to 120 N/m (more preferably 15 N/m to 80 N/m, typically 20 N/m to 50 N/m). The TD tear strength is preferably 6 N/m to 100 N/m (more preferably 8 N/m to 60 N/m, typically 10 N/m to 30 N/m). The tear strength in these ranges tends to bring about, for instance, greater handling properties for renewing the outer surface of the sticky cleaner, etc., along with greater strength. The tear strength of the foam sheet is determined based on JIS K 6767:1999.

The permanent compression set of the foam sheet (e.g. a polyolefinic foam sheet) is not particularly limited. As the support substrate, it is preferable to use a foam sheet that exhibits a permanent compression set of, for instance, about 3.0% to 15.0% (more preferably 5.0% to 15.0%, typically 6.0% to 12.0%). A permanent compression set in these ranges tends to further enhance the dirt-catching ability and the strength of the PSA sheet. The permanent compression set of the foam sheet is determined based on JIS K 6767:1999.

When a single-faced PSA sheet in which a PSA layer is formed on one face of the support substrate is used as the catcher, in order to adjust the unwinding force of the PSA sheet roll to a suitable range, on the backside (the PSA layer-free face) of the support substrate, a release layer of 1 µm to 500 µm (e.g. 5 µm to 300 µm, typically 10 µm to 200 µm) in thickness is preferably formed from a non-polar resin (e.g. a polyolefin, typically polyethylene), etc. Alternatively or additionally, it may be subjected to a surface treatment such as coating of a silicone-based release agent (typically a release treatment to prevent an excessive increase in unwinding force), etc.

The thickness of the support substrate can be suitably selected in accordance with the purpose and is not particularly limited. In general, the thickness is preferably about 20 µm or larger (e.g. 30 µm or larger, typically 40 µm or larger), but suitably about 200 µm or smaller (e.g. 150 µm or smaller, typically 100 µm or smaller, or even 70 µm or smaller). For instance, with respect to a support substrate made of a synthetic resin sheet, nonwoven fabric or paper, such thicknesses can be preferably selected. When the support substrate is a foam sheet, the thickness is preferably about 0.5 mm to 3 mm (e.g. about 0.6 mm to 2 mm, typically about 0.8 mm to 1.2 mm).

<Matters Removed by Sticky Cleaner>

The matter removed by the sticky cleaner disclosed herein is not particularly limited. Various types of matter such as dust and crumbs can be removed. The sticky cleaner disclosed herein has excellent abilities to catch oily crumbs and moist/wet crumbs. Thus, it is preferably used as a sticky cleaner to remove at least either oily crumbs or moist/wet crumbs (typically both). The area on which the sticky cleaner is used can be where oily crumbs and moist/wet crumbs are present. Otherwise, it is not particularly limited.

Specific examples of oily crumbs include solid dirt that comprises an oily component some of which is present on the surface, such as crumbs of snacks such as potato chips; solid dirt originating from a dairy product with a high fat-soluble content; and solid dirt originating from food cooked with oil, such as pan-fried food. Areas where such oily solid dirt is present include floors, carpets and vehicle interior space. Favorable examples of the applicable areas also include the vicinity of a kitchen cooktop. The sticky cleaner disclosed herein can be preferably used in these areas.

Specific examples of moist/wet crumbs include solid dirt having a wet surface such as vegetable scraps present in kitchen sinks. In addition, when a dish containing solid ingredients and water is dropped onto a floor along with a glass container or the like with scattered broken glass pieces and the ingredients, the sticky cleaner disclosed herein can be preferably used from the standpoint of the safety in addition to the ability to catch moist/wet crumbs. Examples of areas where these moist/wet crumbs are present include floors, carpets and vehicle interior space. The inside of a kitchen sink is also a favorable example of the applicable areas. The sticky cleaner disclosed herein can be preferably used in these areas.

Several working examples related to the present invention are described below although the present invention is not to be limited to these specific examples. In the following explanation, the terms "parts" and "%" are by weight unless specifically stated otherwise.

Experiment 1

Example 1

[Preparation of Acrylic PSA Composition A]

In an inert atmosphere, in 80 parts of toluene, were uniformly dissolved and mixed 2-ethylhexyl acrylate (2EHA) and acrylic acid (AA) at a weight ratio 2EHA: AA=95:5. To this, was added 0.2 part benzoyl peroxide as polymerization initiator and polymerization reaction was carried out to prepare a solution of acrylic polymer A with weight average molecular weight (Mw) of about $50 \times 10^4$ to $60 \times 10^4$. Subsequently, to 100 parts of acrylic polymer A, was admixed 2 parts of an isocyanate-based crosslinking agent (trade name CORONATE L available from Nippon Polyurethane Industry Co., Ltd.) to prepare an acrylic PSA composition A.

[Preparation of Acrylic PSA Composition B]

In an inert atmosphere, in 73 parts of methanol, were uniformly dissolved and mixed 24 parts of caprolactone acrylate (trade name ARONIX M-5300 available from Toagosei Co., Ltd., ω-carboxy-polycaprolactone monoacrylate with average value of n in the formula (1)≈1.8), 33 parts of 2-methoxyethyl acrylate, 5 parts of potassium hydroxide (dissolved in 28 parts of purified water) and 5 parts of sodium styrene sulfonate (dissolved in 30 parts of purified water). To this, was added 0.1 part of 2,2'-azobisisobutyronitrile as polymerization initiator and polymerization reaction was carried out to prepare a solution of acrylic polymer B. Subsequently, to 100 parts of acrylic polymer B, were admixed 40 parts of a water-soluble plasticizer and 2 parts of a crosslinking agent to prepare an acrylic PSA composition B.

As the water-soluble plasticizer, was used polyoxypropylene sorbitol ether (polyhexaol, trade name SANNIX SP-750 available from Sanyo Chemical Industries, Ltd.). As the crosslinking agent, was used a Bifunctional epoxy compound (trade name DENACOL EX-830 available from Nagase Chemtex Corporation, polyethylene glycol diglycidyl ether with polymerization degree (n) 9).

[Construction of Sticky Cleaner]

As a support substrate, was obtained an approximately 0.8 mm thick polyethylene foam sheet having a closed-cell structure having a second face (the backside, opposite to the face on which a PSA layer was formed) laminated with 20 am thick polyethylene film. The foam sheet used had a density of 18 kg/m³ to 25 kg/m³, MD tensile strength of 0.90 MPa to 1.10 MPa, TD tensile strength of 0.26 MPa to 0.34 MPa, MD elongation of 27% to 43%, TD elongation of 40% to 60%, MD shear strength of 20 N/m to 30 N/m, TD shear strength of 10 N/m to 20 N/m, and compression set in a range of 8.0% to 12.0%.

The first face of the support substrate was subjected to corona discharge treatment. To the corona-treated face of the support substrate, the acrylic PSA composition A obtained above was applied and dried at 110° C. for 3 minutes to form an approximately 25 μm thick (coating thickness) PSA layer (first PSA layer) on the single face of the support substrate.

To a release face of a releasable support, the acrylic PSA composition B obtained above was applied and dried to form stripes of an approximately 20 μm thick (coating thickness) PSA layer (second PSA layer) on the single face of the releasable support.

The first PSA layer formed on the support substrate and the second PSA layer formed on the releasable support were layered to form a PSA sheet wherein the first PSA layer was formed on the first face of the support substrate and stripes of the second PSA layer were further formed partially thereon. The adhesive surface of the PSA sheet was protected with the releasable support. In the second PSA layer, the width W1 of a stripe was about 1.0 mm and the space W2 between stripes was about 1.0 mm.

From the resulting single-faced PSA sheet, the releasable support was peeled off and the PSA sheet was wound around the surface of a cylindrical holding member made of paper to form a PSA sheet roll. A main cleaner body 15 was obtained as schematically illustrated in FIGS. 1 and 2. To its hollow-columnar rolling member 40 made of polypropylene, was attached the holding member 20 to construct a sticky cleaner 10 according to this Example.

The resulting sticky cleaner was subjected to the tests described below. For comparison, using a commercial roller cleaner for floorings (COLOCOLO® flooring cleaner available from Nitoms, Inc., support substrate: a polyethylene foam sheet) as Reference Example, the same tests were conducted. The results are shown in Table 1.

[Oily Dirt Adhesion Test]

The single-faced PSA sheet was cut to a 157 mm by 150 mm size (adhesive surface area 0.02355 m²) to prepare a test sample. With the adhesive surface on the outside, the test sample was adhered entirely onto the outer surface (circumferential face) of PSA sheet roll 30 (50 mm roll outer diameter, 160 mm width) of sticky cleaner 10 shown in FIGS. 1 and 2 to fabricate a test cleaner. The test cleaner had a rolling member 40 (about 26.5 g in weight) and a handle 52 both made of polypropylene as well as a grip member 50 with a stainless steel pole-shaped part of 5 mm diameter. The test cleaner was about 40 cm in length and about 241 g in total weight with PSA sheet roll 30 and main cleaner body weighing about 113 g and about 128 g, respectively. As the PSA sheet roll 30, was used the PSA sheet roll (about 1 cm in thickness of wound layers) of the commercial roller cleaner for floorings.

An oily dirt sample for testing was also obtained. The oily dirt sample was obtained by adding 5 parts of edible oil to 100 parts of quartz sand as aggregate and vigorously shaking the resulting mixture in a plastic bag to distribute the edible oil evenly through the quartz sand. As the quartz sand used in the test, was used color aggregate (SINTO® color sand 34 series, central particle diameter 1.20 mm to 1.50 mm, standard sieve size 0.5 mm to 2.4 mm) available from Shintoh Tohryoh Co., Ltd. As the edible oil, was used Nisshin Canola Oil Healthy Light available from Nisshin Oillio Group.

200 g of the resulting oily dirt sample was evenly spread over the entire flat bottom face of a tray (240 mm by 320 mm stainless steel tray). As shown in FIG. 4, on tray T with oily dirt sample 100, the adhesive surface 32A of test cleaner 10' fabricated was brought into contact and rotated to make two round trips between the two edges of the length direction (the two widthwise edges) of the tray T to cause oily dirt sample 100 to adhere to the adhesive surface 32A.

After oily dirt sample 100 was adhered, the weight W1 (g) of sticky cleaner 10' was determined. Based on the difference from the pre-determined initial weight W0 (g) of the sticky cleaner 10' before the oily dirt sample was adhered, the adhered amount W2 of oily dirt sample was determined (W2 (g)=W1−W0). W2 (g) was divided by the area (m$^2$) of exposed adhesive surface 32A of the test sample to determine the adhered amount $A_1$ (g/m$^2$) of oily dirt sample per m$^2$ of adhesive surface. The test was conducted five times and their average value was recorded.

[Oily Dirt Loss Test]

After the oily dirt adhesion test, an oily dirt loss test was continuously conducted in the following manner: As shown in FIG. 5(a), above a hard flat surface G formed of plastic, with the PSA sheet roll 30 of test cleaner 10' bearing oily dirt sample 100 oriented with its cylindrical axis in the vertical direction and the bottom end (base) of the PSA sheet roll 30 placed 5 cm in height (indicated by h in FIG. 5(a)) above the hard flat surface G, the end of grip member 50 on the handle 52 side was fixed onto a jig J in a vertically freely rotatable manner. Test cleaner 10' was held at the height with a spacer (not shown in the drawing) placed between the bottom end of the PSA sheet roll 30 and the hard flat surface G. The spacer was pulled out to drop the PSA sheet roll 30 side of test cleaner 10' as shown in FIG. 5(b). More specifically, it was dropped in a near-free-fall state in the direction of arrow A in FIG. 5(b). The weight W4 (g) of the dropped test cleaner 10' was determined. Based on the difference from the pre-determined initial weight W3 of test cleaner 10' before dropped, the amount W5 of oily dirt sample lost (that has fallen off) was determined (W5 (g)=W3−W4). The percent (%) loss $A_2$ of oily dirt sample was determined by the equation:

$$A_2(\%)=W5/(W3-W0)\times100$$

In each Example, W3 and W1 were the same value. The test was conducted five times and their average value was recorded.

[Moist/Wet Dirt Adhesion Test and Loss Test]

The oily dirt sample was changed to a moist/wet dirt sample described below. Otherwise in the same manner as the oily dirt adhesion and loss tests, moist/wet dirt adhesion and loss tests were conducted to determine the adhered amount $B_1$ (g/m$^2$) and the percent (%) loss $B_2$ of moist/wet dirt sample. The moist/wet dirt sample used was obtained by adding 20 parts of an aqueous surfactant solution to 100 parts of quartz sand as aggregate and vigorously shaking the mixture in a plastic bag to evenly distribute the aqueous solution through the quartz sand. As the quartz sand, was used color aggregate (SINTO® color sand 34 series, central particle diameter 1.20 mm to 1.50 mm, standard sieve size 0.5 mm to 2.4 mm) available from Shintoh Tohryoh Co., Ltd. As the aqueous surfactant solution, was used an aqueous solution prepared by dissolving 5% surfactant (40% lauryl sulfate triethanolamine solution (available from Wako Pure Chemical Industries, Ltd.) in water (distilled water).

[Generic Solid Dirt Adhesion Test and Loss Test]

The oily dirt sample was changed to a generic solid dirt sample described below. Otherwise in the same manner as the oily dirt adhesion and loss tests, generic solid dirt adhesion and loss tests were conducted to determine the adhered amount (g/m$^2$) of generic solid dirt sample and the percent (%) loss of generic solid dirt sample. As the generic solid dirt sample, was used color aggregate (SINTO® color sand 34 series, central particle diameter 1.20 mm to 1.50 mm, standard sieve size 0.5 mm to 2.4 mm) available from Shintoh Tohryoh Co., Ltd.

TABLE 1

|  | Ex. 1 | Ref. Ex. |
|---|---|---|
| Adhered amount $A_1$ of oily dirt sample (g/m$^2$) | 825 | 340 |
| % loss $A_2$ of oily dirt sample | 5.10 | 51.8 |
| Adhered amount $B_1$ of oily dirt sample (g/m$^2$) | 531 | 335 |
| % loss $B_2$ of oily dirt sample | 2.47 | 53.2 |
| Adhered amount of generic solid dirt sample (g/m$^2$) | 649 | 623 |
| % loss of generic solid dirt sample | 0.20 | 0.89 |

Experiment 2

Examples 2-1 to 2-3

The thickness of the first PSA layer was changed to the values shown in Table 2. Otherwise in the same manner as Example 1, sticky cleaners according to Examples 2-1, 2-2 and 2-3 were constructed. These were subjected to measurements of to-SUS adhesive strength (N/25 mm), to-PE adhesive strength (N/25 mm) and unwinding force (N/160 mm). For each test item, the measurement was carried out five times. For comparison, using a commercial roller cleaner for floorings (COLOCOLO® flooring cleaner available from Nitoms, Inc., support substrate: a polyethylene foam sheet) as Reference Example, the same test was conducted. The results are shown in Table 2.

TABLE 2

|  | Ex. 2-1 | Ex. 2-2 | Ex. 2-3 | Ref. Ex. |
|---|---|---|---|---|
| Thickness of $1^{st}$ PSA layer (μm) | 12 | 15 | 30 | 12 |
| To-SUS adhesive strength (N/25 mm) | 5.3-6.2 | 6.4-7.2 | 7.4-8.5 | 0.8 |
| To-PE adhesive strength (N/25 mm) | 2.0-2.8 | 2.5-3.8 | 3.1-7.3 | 0.5 |
| Unwinding force (N/160 mm) | 5.0-5.5 | 5.0-5.6 | 6.4-7.0 | 2.0 |

As shown in Table 1, in Example 1, the adhered amount $A_1$ of oily dirt sample and the adhered amount $B_1$ of moist/wet dirt sample were 350 g/m$^2$ or greater. On the other hand, in Reference Example using a commercial roller cleaner for floorings, both the adhered amount $A_1$ of oily dirt sample and the adhered amount $B_1$ of moist/wet dirt sample were less than 350 g/m$^2$. The sticky cleaners according to Examples 2-1 to 2-3 had great adhesive strength and unwinding force. These results indicate that the sticky cleaner disclosed herein sufficiently catch oily dirt and moist/wet dirt, whereby a wider range of matter can be removed by it as compared with conventional sticky cleaners.

Although specific embodiments of the present invention have been described in detail above, these are merely for illustrations and do not limit the scope of patent claims. The art according to the patent claims includes various modifications and changes made to the specific embodiments illustrated above.

REFERENCE SIGNS LIST 10 sticky cleaner
15 main cleaner body
20 holding member
30 PSA sheet roll
31 PSA sheet (catcher)
32 PSA layer
32A adhesive surface
33 first PSA layer (first catching part)
34 second PSA layer (second catching part)
36 support substrate
40 rolling member
50 grip member
52 handle
100 solid dirt sample

The invention claimed is:

1. A sticky cleaner comprising a catcher to catch matter to be removed, wherein
the catcher has an adhesive surface formed of a pressure-sensitive adhesive, and
the sticky cleaner satisfies the following properties:
(A1) in an oily dirt adhesion test to determine an adhered amount of an oily dirt sample, the sticky cleaner shows an adhered amount $A_1$ of the oily dirt sample per $m^2$ of the adhesive surface of 200 $g/m^2$ or greater, wherein the oily dirt sample is prepared by adding 5 parts by weight of edible oil to 100 parts by weight of aggregate having a central particle diameter of 1.20 mm to 1.50 mm;
(B1) in a moist/wet dirt adhesion test to determine an adhered amount of a moist/wet dirt sample, the sticky cleaner shows an adhered amount $B_1$ of the moist/wet dirt sample per $m^2$ of the adhesive surface of 190 $g/m^2$ or greater, wherein the moist/wet dirt sample is prepared by adding 20 parts by weight of an aqueous solution with 5% by weight of a surfactant to 100 parts by weight of aggregate having a central particle diameter of 1.20 mm to 1.50 mm; and
the sticky cleaner shows at least the adhered amount $A_1$ of the oily dirt sample or the adhered amount $B_1$ of the moist/wet dirt sample is 350 $g/m^2$ or greater.

2. The sticky cleaner according to claim 1, further satisfying the property: (A2) in an oily dirt loss test where the sticky cleaner bearing the oily dirt sample is dropped from a height of 5 cm to a hard surface, the sticky cleaner shows 50% or lower percent loss $A_2$ of the oily dirt sample.

3. The sticky cleaner according to claim 1, further satisfying the property: (B2) in a moist/wet dirt loss test where the sticky cleaner bearing the moist/wet dirt sample is dropped from a height of 5 cm to a hard surface, the sticky cleaner shows 50% or lower percent loss $B_2$ of the moist/wet dirt sample.

4. The sticky cleaner according to claim 1, wherein the catcher comprises a first catching part forming part of the adhesive surface and a second catching part forming other part of the adhesive surface.

5. The sticky cleaner according to claim 4, wherein each of the first and second catching parts is exposed on the adhesive surface in stripes.

6. The sticky cleaner according to claim 1, wherein the catcher is formed as an adhesively single-faced pressure-sensitive adhesive sheet comprising a support substrate sheet and a pressure-sensitive adhesive layer placed on one face of the support substrate to form the adhesive surface.

7. The sticky cleaner according to claim 6, wherein the support substrate is a foam sheet.

8. The sticky cleaner according to claim 6, wherein the adhesive surface exhibits a 180° peel strength of 9 N/25 mm or less.

9. The sticky cleaner according to claim 1, wherein the single-faced pressure-sensitive adhesive sheet is wound with the pressure-sensitive adhesive layer on the outside to form a pressure-sensitive adhesive sheet roll.

10. The sticky cleaner according to claim 9, wherein the sticky cleaner comprises a cylindrical rolling member and the pressure-sensitive adhesive sheet roll is placed laterally on the rolling member.

11. The sticky cleaner according to claim 10, further comprising a grip member that supports the rolling member in a freely rotatable manner.

12. A sticky cleaner comprising a catcher to catch matter to be removed, wherein
the catcher has an adhesive surface formed of a pressure-sensitive adhesive, and
the catcher comprises an oily-dirt-catching part as a first catching part forming part of the adhesive surface and a moist/wet-dirt-catching part as a second catching part forming other part of the adhesive surface.

13. The sticky cleaner according to claim 12, wherein each of the first and second catching parts is exposed on the adhesive surface in stripes.

14. The sticky cleaner according to claim 12, wherein the catcher is formed as an adhesively single-faced pressure-sensitive adhesive sheet comprising a support substrate sheet and a pressure-sensitive adhesive layer placed on one face of the support substrate to form the adhesive surface.

15. The sticky cleaner according to claim 14, wherein the support substrate is a foam sheet.

16. The sticky cleaner according to claim 14, wherein the adhesive surface exhibits a 180° peel strength of 9 N/25 mm or less.

17. The sticky cleaner according to claim 14, wherein the single-faced pressure-sensitive adhesive sheet is wound with the pressure-sensitive adhesive layer on the outside to form a pressure-sensitive adhesive sheet roll.

18. The sticky cleaner according to claim 17, wherein the sticky cleaner comprises a cylindrical rolling member and the pressure-sensitive adhesive sheet roll is placed laterally on the rolling member.

19. The sticky cleaner according to claim 18, further comprising a grip member that supports the rolling member in a freely rotatable manner.

* * * * *